US008081093B2

(12) United States Patent
Matsubara

(10) Patent No.: US 8,081,093 B2
(45) Date of Patent: Dec. 20, 2011

(54) CODE TRANSFORMING APPARATUS AND CODE TRANSFORMING METHOD

(75) Inventor: Akio Matsubara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1257 days.

(21) Appl. No.: 11/796,726

(22) Filed: Apr. 27, 2007

(65) Prior Publication Data
US 2007/0256057 A1 Nov. 1, 2007

(30) Foreign Application Priority Data

Apr. 28, 2006 (JP) .................................. 2006-125938

(51) Int. Cl.
*H03M 7/30* (2006.01)
(52) U.S. Cl. ............. 341/87; 341/51; 382/243; 715/242
(58) Field of Classification Search ........................ None
See application file for complete search history.

(56) References Cited

U.S. PATENT DOCUMENTS

| | | | | |
|---|---|---|---|---|
| 4,814,746 | A * | 3/1989 | Miller et al. ...................... | 341/95 |
| 5,870,036 | A * | 2/1999 | Franaszek et al. ................ | 341/51 |
| 6,088,699 | A * | 7/2000 | Gampper et al. ................ | 341/87 |
| 6,263,106 | B1 * | 7/2001 | Yamagata ...................... | 382/232 |
| 6,870,961 | B2 | 3/2005 | Matsubara | |
| 7,113,645 | B2 | 9/2006 | Sano | |
| 7,184,603 | B2 * | 2/2007 | Gringeler et al. ............. | 382/244 |
| 2003/0068089 | A1 | 8/2003 | Sano | |
| 2004/0012601 | A1 * | 1/2004 | Sang et al. ..................... | 345/581 |
| 2004/0146206 | A1 | 7/2004 | Matsubara | |
| 2004/0151387 | A1 | 8/2004 | Sakuyama | |
| 2004/0161156 | A1 | 8/2004 | Matsubara | |
| 2005/0058353 | A1 | 3/2005 | Matsubara | |
| 2005/0175248 | A1 | 8/2005 | Matsubara | |
| 2006/0067561 | A1 | 3/2006 | Matsubara | |

FOREIGN PATENT DOCUMENTS

| | | |
|---|---|---|
| JP | HEI 11-031101 | 2/1999 |
| JP | 2000-293413 | 10/2000 |
| JP | 2004-173125 | 6/2004 |

OTHER PUBLICATIONS 5.2.7 Shared Data, "Information Technology—JPEG2000 Image Coding System—Part 6: Compound Image File Format, JPEG 2000 Part 6 FDIS," ISO/IEC 15444-6, Dec. 9, 2002.
5.2.7 Shared Data, "Information Technology—JPEG2000 Image Coding System—Part 2: Extensions, JPEG2000 Part2 FDIS" ISO/IEC 15444-2, Aug. 8, 2001.
ITU—International Telegraph and Telephone Consultative Committee (CCITT), Information Technology—Digital Compression and Coding of Continuous-Tone Still Images—Requirements and Guidelines, Recommendation T.81 ISO/IEC 10918-1: 1993(E), Sep. 1992.

* cited by examiner

*Primary Examiner* — Howard Williams
(74) *Attorney, Agent, or Firm* — Blakely, Sokoloff, Taylor & Zafman LLP

(57) ABSTRACT

A code transforming apparatus inputs therein a first codestream of a target file, and outputs a second codestream transformed from the first codestream. In the code transforming apparatus, a BOX decomposing unit extracts BOX information from the first codestream. A sharing/referencing determining unit determines whether sharing process or referencing process is to be performed on the BOX information. A sharing/referencing processing unit performs the sharing process or the referencing process on the BOX information based on a determination result from the sharing/referencing determining unit. The sharing/referencing processing unit can specify a logical set of codes on a referenced side as a unit of reference for referencing an incremental codestream.

10 Claims, 23 Drawing Sheets

FIG. 3
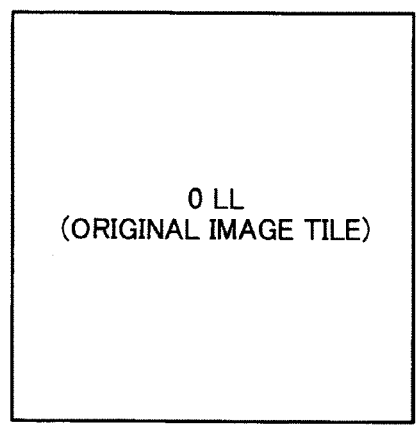
Decomposition_Level_0
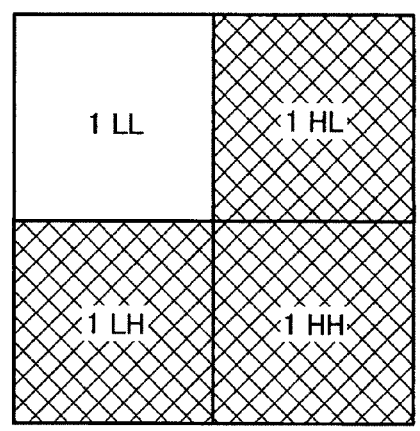
Decomposition_Level_1
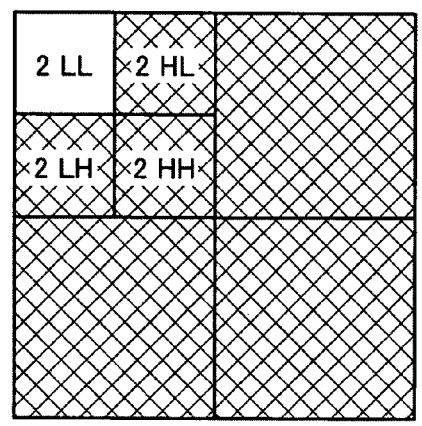
Decomposition_Level_2
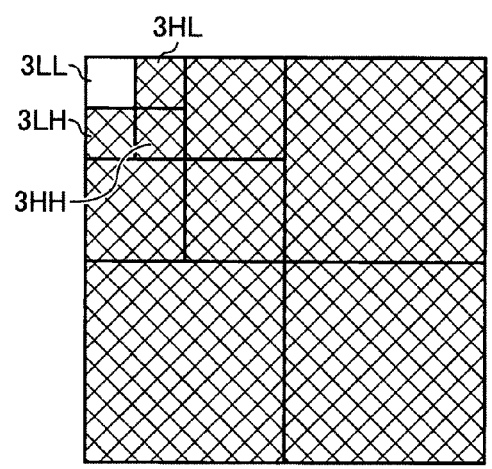
Decomposition_Level_3

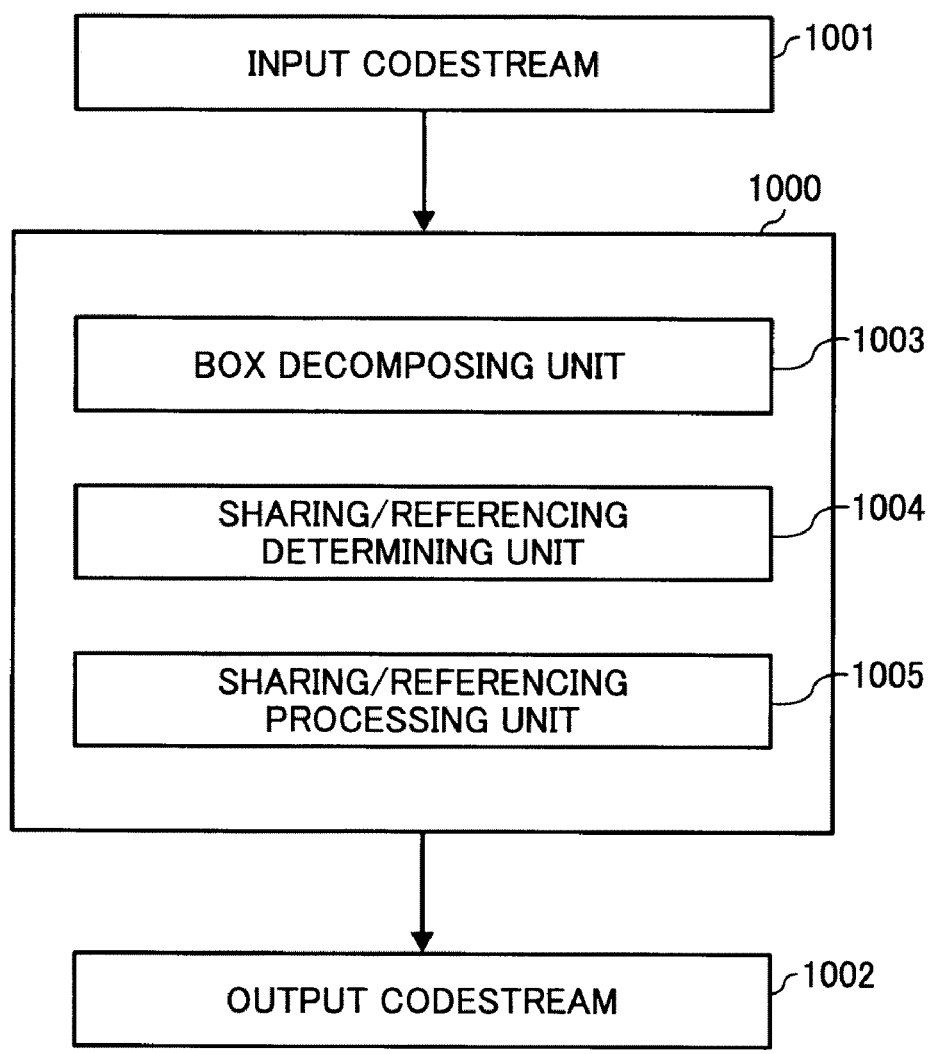

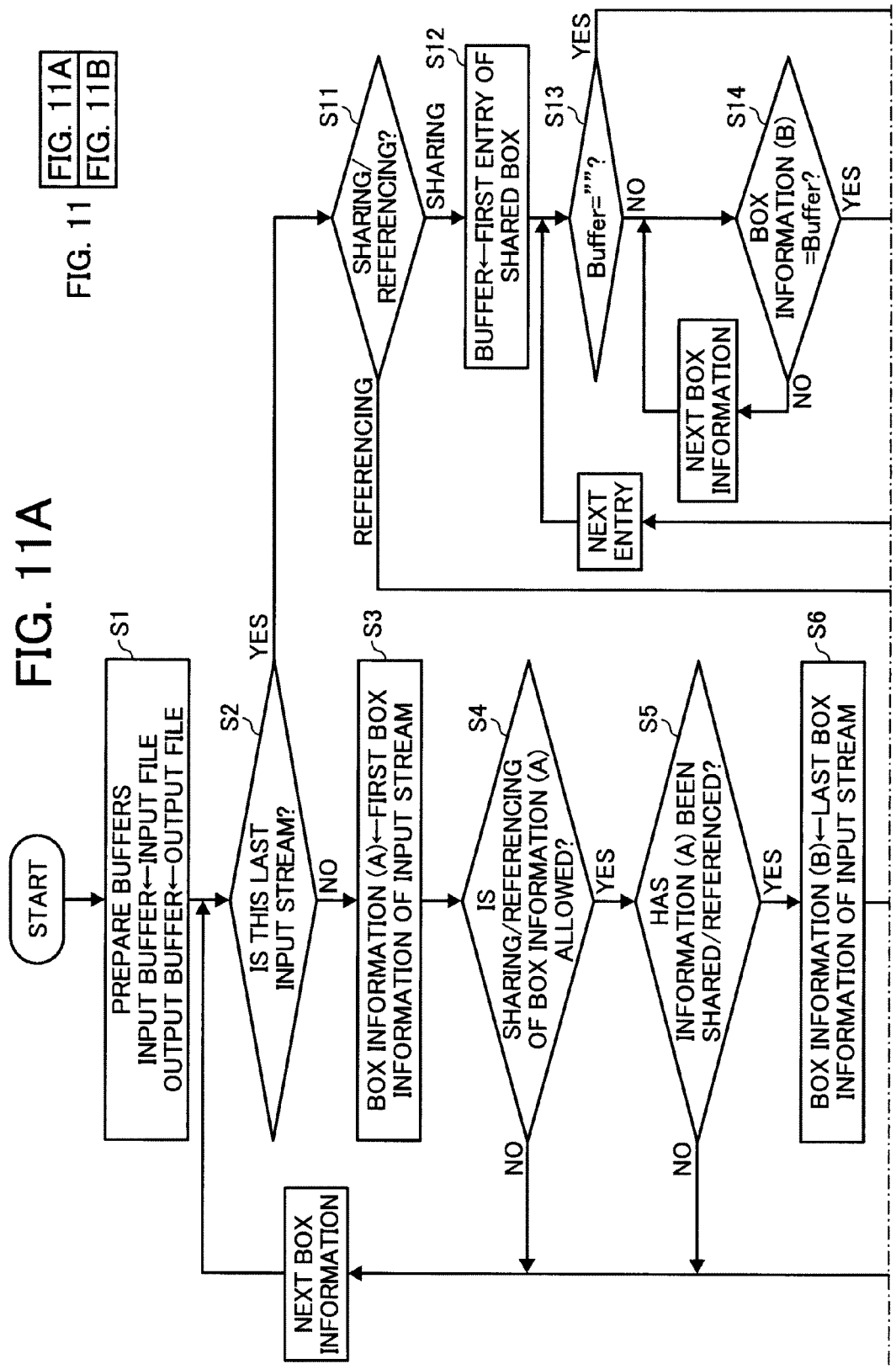

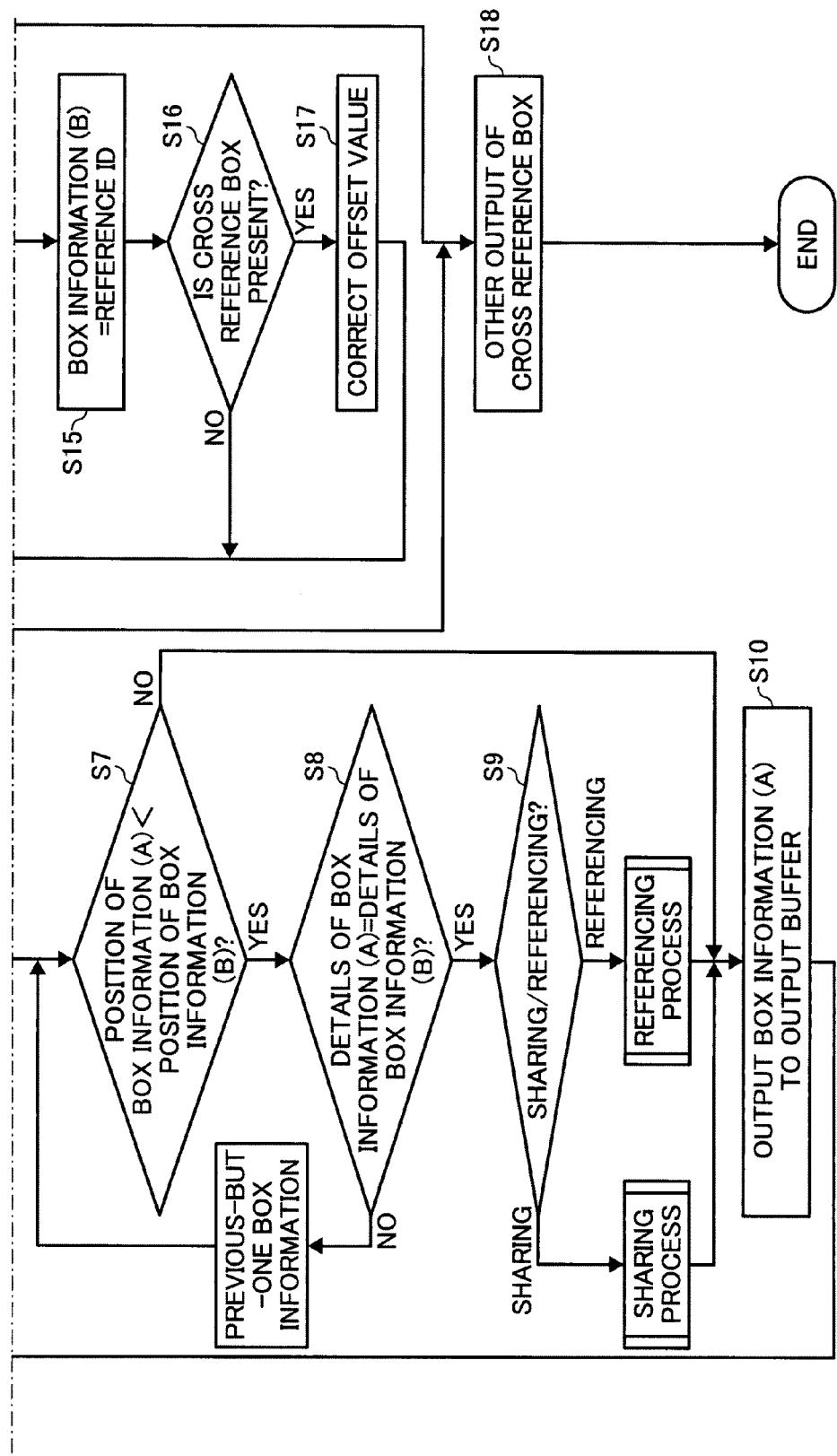

FIG. 16
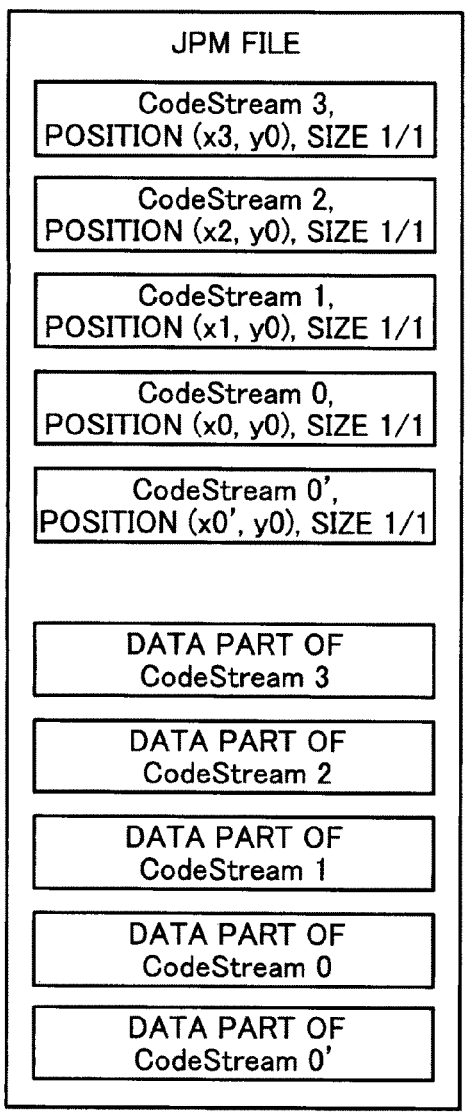
(A) FILE WITHOUT REFERENCING
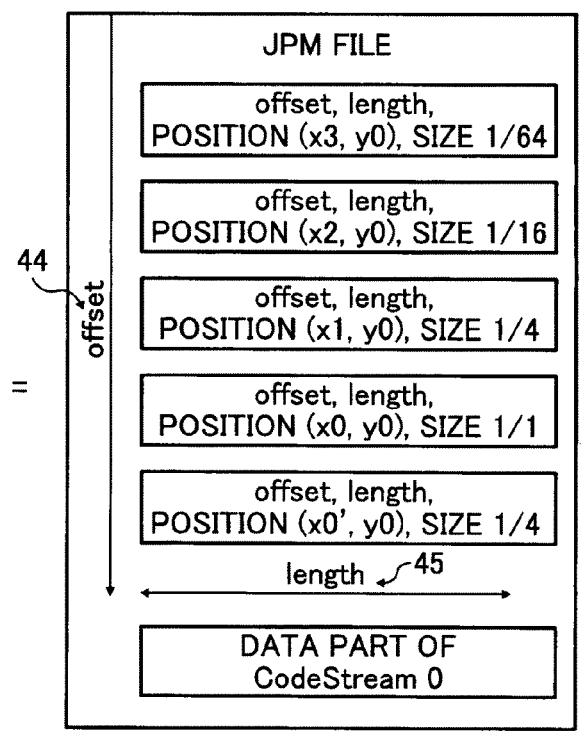
(B) FILE WITH REFERENCING

CODE TRANSFORMING APPARATUS AND CODE TRANSFORMING METHOD

PRIORITY

The present application claims priority to and incorporates by reference the entire contents of Japanese priority document, 2006-125938, filed in Japan on Apr. 28, 2006.

BACKGROUND OF THE INVENTION

1. Field of the Invention

The present invention relates to a code transforming apparatus and code transforming method.

2. Description of the Related Art

Japanese Patent Application Laid-Open No. 2000-293413 discloses an invention in which a common part and a non-common part of a plurality of files on a storage medium are distinguished from each other, with file commonality information for the common part and the non-common part being stored for each file and the common part being shared among the plurality of files.

Briefly, in the technology disclosed in the patent document as mentioned above, instead of redundancy compression, a code format characteristic having a BOX structure is used to achieve reversible compression of files.

As an example of such a code format having a BOX structure, there is the one in which sharing/referencing is not defined in BOX information. Reference may be had to, for example, Annex B pp. 31-49, "Information Technology Digital Compression and Coding of Continuous Tone Still Images Requirements and Guidelines, Terminal Equipment and Protocols for Telematic Services, The International Telegraph and Telephone Consultative Committee", Recommendation T.81, September 1992, International Telecommunication Union (hereinafter, "first non-patent document"). As another example, there is the one in which sharing/referencing is defined in BOX information. Reference may be had to, for example, 5.2.7 Shared Data, "Information technology-JPEG2000 Image Coding System-Part 6: Compound Image File Format, JPEG2000 Part 6 FDIS", 9 Dec. 2002, ISO/IEC 15444-6 (hereinafter, "second non-patent document"), and 5.2.7 Shared Data, "Information technology-JPEG2000 Image Coding System-Part 2: Extensions, JPEG2000 Part 2 FDIS", 8 Aug. 2001, ISO/IEC 15444-2 (hereinafter, "third non-patent document"). The term "BOX" indicates an object encapsulated in a file and having a binary structure. A code format targeted in the present invention is the latter code format in which sharing/referencing is defied in BOX information.

FIG. 22 depicts a JPEG syntax disclosed in the first non-patent document. As shown in FIG. 22, "Entropy-coded segments" 30 and "Entropy-coded segment$_{last}$" 31 are synchronized with each other with "restart interval end symbol RST" 32 to form one "Scan$_1$" 33, and "Frame" 34 is formed as an aggregate of these "Scan", the aggregate being encapsulated with "SOI marker" 35 and "EOI marker" 36 to form a code format. However, in this code format, even there are a plurality of "Entropy-coded segments" of the same content in one file, the first non-patent document does not define at all a mechanism of sharing or referencing these segments.

FIG. 23 depicts a conceptual structure of a JPM (JPEG2000 Multi Page) file disclosed in the second non-patent document. In the second non-patent document, sharing/referencing of BOXes of "Contiguous Codestream Boxes" 37, "Metadata Boxes" 28, and other boxes illustrated in FIG. 23 are defined.

In the meanwhile, there may be the case where the same images are disposed in different sizes on the same page of a document or a common logo mark or the like is printed over a plurality of pages of a document. For such an image as a common logo mark, if one codestream is shared/referenced among all files of a document, the files can be made more compact. When a large amount of pages of a manual is created by sharing the load among a plurality of persons, the color phase of a logo mark and others may be slightly different for each section (page). If a codestream of one logo mark is shared/referenced among all files of the document, the files can be made compact and also the color phase of the logo mark and others can be made evenly. This is advantageous in appearance of the document.

However, in order to share/reference an object of a common logo mark, for example, it is not practical to manually search binary data of the logo mark for performing an operation of sharing/referencing.

SUMMARY OF THE INVENTION

A code transforming apparatus and code transforming method are described. In one embodiment, a code transforming apparatus that performs a transforming process to transform a first codestream of a target file into a second codestream that is equivalent in content to the first codestream and smaller in file size, where the code transforming apparatus comprises: an extracting unit that extracts BOX information from the first codestream; a determining unit that determines whether any one of a sharing process and a referencing process is to be performed on the BOX information; and a processing unit that performs any one of the sharing and referencing processes on the BOX information based on a determination result from the determining unit. The processing unit can specify a logical set of codes on a referenced side as a unit of reference for referencing an incremental codestream.

BRIEF DESCRIPTION OF THE DRAWINGS

FIG. 3 is a schema illustrating sub-bands at the respective decomposition levels when the number of decomposition levels is three;

FIG. 10 is a block diagram of a functional structure of the code transforming apparatus;

FIG. 11 is a flowchart illustrating the operation of the code transforming apparatus;

FIG. 16 is an example of a JPM file without referencing and a JPM file with reference obtained by changing the JPM file without referencing to be compact in size;

DETAILED DESCRIPTION OF THE PREFERRED EMBODIMENTS

Embodiments of the present invention at least partially solve the problems in the conventional technology.

According to an embodiment of the present invention, a code transforming apparatus that performs a transforming process to transform a first codestream of a target file into a second codestream that is equivalent in content to the first codestream and smaller in file size, includes an extracting unit that extracts BOX information from the first codestream, a determining unit that determines whether any one of a sharing process and a referencing process is to be performed on the BOX information, and a processing unit that performs any one of the sharing and referencing processes on the BOX information based on a determination result from the determining unit. The processing unit can specify a logical set of codes on a referenced side as a unit of reference for referencing an incremental codestream.

The above and other embodiments, features, advantages and technical and industrial significance of this invention will be better understood by reading the following detailed description of presently preferred embodiments of the invention, when considered in connection with the accompanying drawings.

Exemplary embodiments of the present invention are explained in detail below with reference to the accompanying drawings.

First, outlines of a "hierarchical coding algorithm" and a "coding and decoding algorithm based on discrete wavelet transform" are explained. The "JPEG2000 algorithm" is a typical example of the "coding and decoding algorithm based on discrete wavelet transform".

Figure 1:
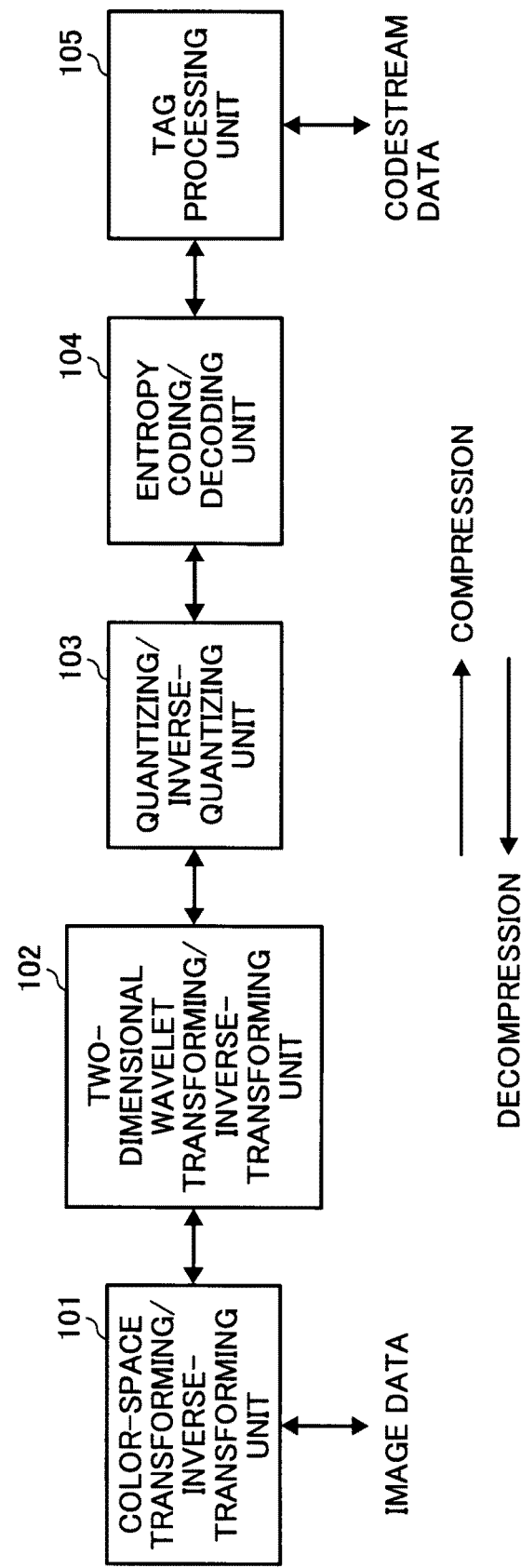
FIG. 1 is a functional block diagram of a system that achieves a hierarchical coding algorithm serving as a basis of a coding and decoding scheme based on discrete wavelet transform serving as a premise of the present invention.

FIG. 1 is a functional block diagram of a system that achieves a hierarchical coding algorithm serving as a basis of a coding scheme based on discrete wavelet transform. This system functions as an image compressing unit, including function blocks of a color-space transforming/inverse-transforming unit 101, a two-dimensional wavelet transforming/inverse-transforming unit 102, a quantizing/inverse-quantizing unit 103, an entropy coding/decoding unit 104, and a tag processing unit 105.

One of the major differences of this system compared with the conventional JPEG algorithm is a transform scheme.

While Discrete Cosine Transform (DTS) is used in JPEG, Discrete Wavelet Transform (DWT) is used in the hierarchical coding algorithm at the two-dimensional wavelet transforming/inverse-transforming unit 102. Compared with DCT, DWT has an advantage of high image quality in highly-compressed areas. This advantage is one of the main reasons why DWT is adopted in JPEG2000, which is a succeeding algorithm of JPEG.

Another major difference is that, in this hierarchical coding algorithm, the tag processing unit 105, which is a functional block for code formation, is added to the last stage of the system. At the tag processing unit 105, compressed data is generated as codestream data at the time of an image compressing operation, and codestream data required for decompression is interpreted at the time of a decompressing operation. With codestream data, JPEG2000 can achieve various convenient functions. For example, a compressing/decompressing operation on a still image can be freely stopped at an arbitrary layer (a decomposition level) corresponding to octave split in DWT on a block basis (refer to FIG. 3, which will be explained further below). Also, a low-resolution image (reduced image) can be extracted from one file, and part of an image (tiling image) can also be extracted.

An input/output part of the original image is often coupled to the color-space transforming/inverse-transforming unit 101. An example is such a part to be transformed or inverse-transformed from an RGB colorimetric system formed of components of a primary color system, R(red)/G(green)/B (blue), or a YMC colorimetric system formed of components of a complementary color system, Y(yellow)/M(magenta)/C (cyan), to a YUV or YCbCr colorimetric system.

Figure 2:
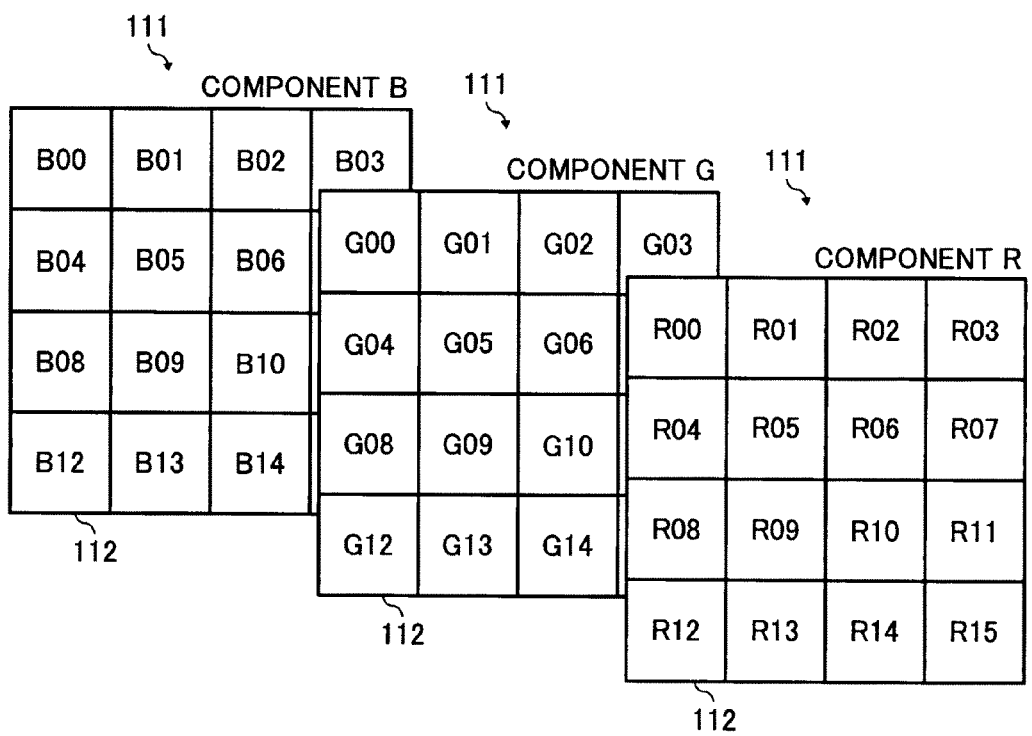
FIG. 2 is a schema illustrating divided rectangle areas of components of an original image.

Next, the JPEG2000 algorithm is explained. In general, each component 111 (here, in the RGB primary color system) of an original image is divided into rectangular-shaped areas. These rectangular areas obtained through division are generally called blocks or tiles. Since they are generally called tiles in JPEG2000, these rectangular areas obtained through division are hereinafter referred to tiles (in the example of FIG. 2, each component 111 is divided into sixteen rectangular tiles 112 (four tiles in length and four tiles in width). These individual tiles 112 (in the example of FIG. 2, R00, R01, ..., R15/G00, G01, ..., G15/B00, B01, ..., B15) forms a basic unit for compressing and decompressing image data. Therefore, the operation of compressing and decompressing image data is performed independently for each component or each tile 112.

At the time of coding image data, the data of each tile 112 of each component 111 is input to the color-space transforming/inverse-transforming unit 101 in FIG. 1 for color-space transform, and is then subjected to two-dimensional wavelet transform (forward transform) at the two-dimensional wavelet transforming/inverse-transforming unit 102 for being space-divided to a frequency band.

FIG. 3 depicts sub-bands of the respective decomposition levels when the number of decomposition levels is three. That is, a tile original image obtained through tile division of the original image (0LL) (decomposition level 0) is subjected to two-dimensional wavelet transform to separate sub-bands (1LL, 1HL, 1LH, and 1HH) depicted at a decomposition level 1. Then, the low-frequency component 1LL at this layer is subjected to two-dimensional wavelet transform to separate sub-bands (2LL, 2HL, 2LH, and 2HH) depicted at a decomposition level 2. Similarly in sequence, the low-frequency component 2LL is subjected to two-dimensional wavelet transform to separate sub-bands (3LL, 3HL, 3LH, and 3HH) depicted at a decomposition level 3. In FIG. 3, sub-bands targeted for coding at each decomposition level are represented as being hatched. For example, when the number of decomposition levels is three, the sub-bands represented as being hatched (3HL, 3LH, 3HH, 2HL, 2LH, 2HH, 1HL, 1LH, and 1HH) are to be coded, while the sub-band 3LL is not coded.

Next, bits to be coded are defined in the specified order of coding, and then a context is generated from bits near the target bits by the quantizing/inverse-quantizing unit 103 shown in FIG. 1.

Figure 4:
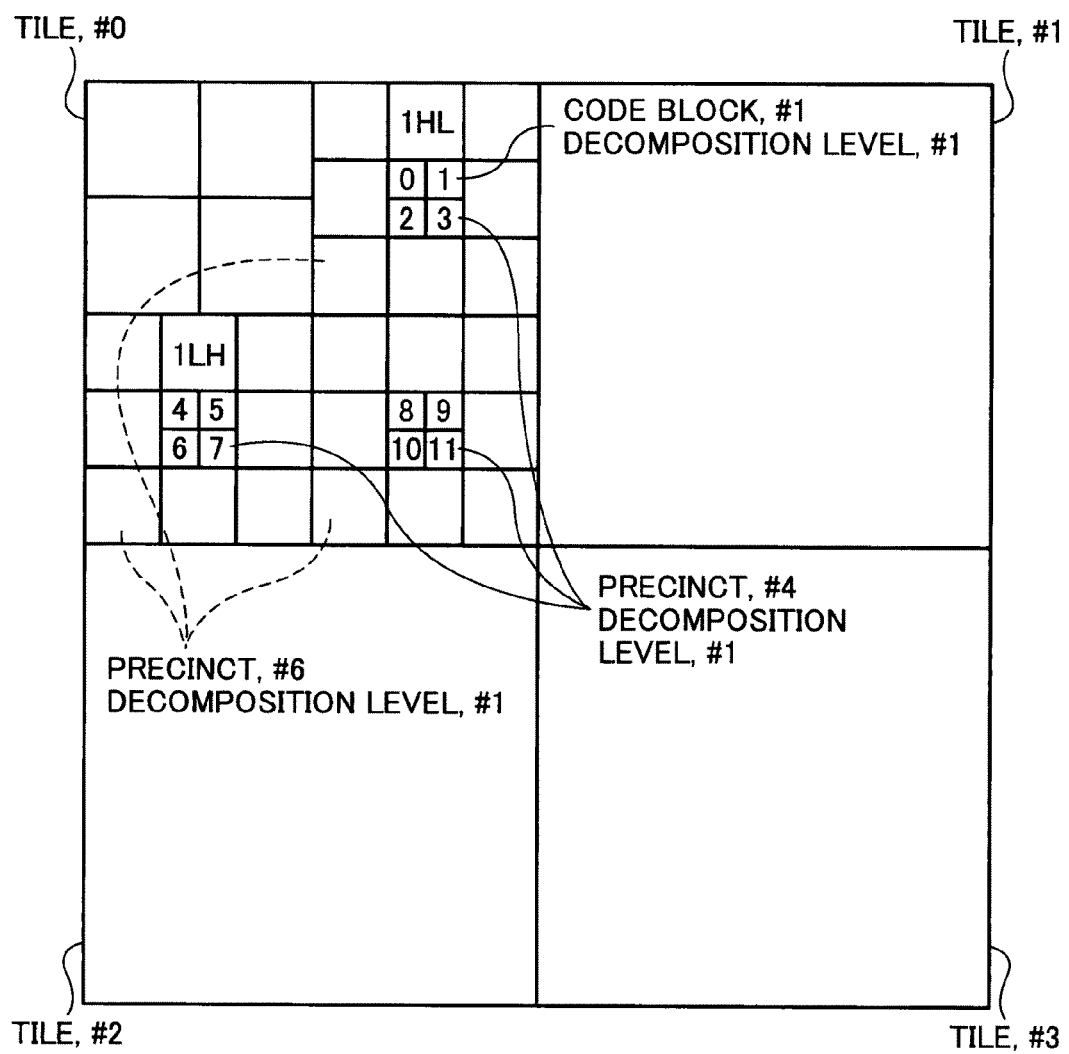
FIG. 4 is a schema illustrating precincts.

A wavelet coefficient after this quantizing process is completed is divided into non-redundant rectangles called "precincts" for each sub-band. This is introduced for efficiently using memory in implementation. As shown in FIG. 4, one precinct is formed of three rectangular areas that are matched in space. Furthermore, each precinct is divided into non-redundant rectangular "code blocks", each of which serves as a basic unit in entropy coding.

The coefficient value after wavelet transform can be quantized and coded as it is. However, in JPEG2000 for the purpose of increasing coding efficiency, the coefficient value can be decomposed in units of "bit planes" for ranking the "bit planes" for each pixel or code block.

Figure 5:
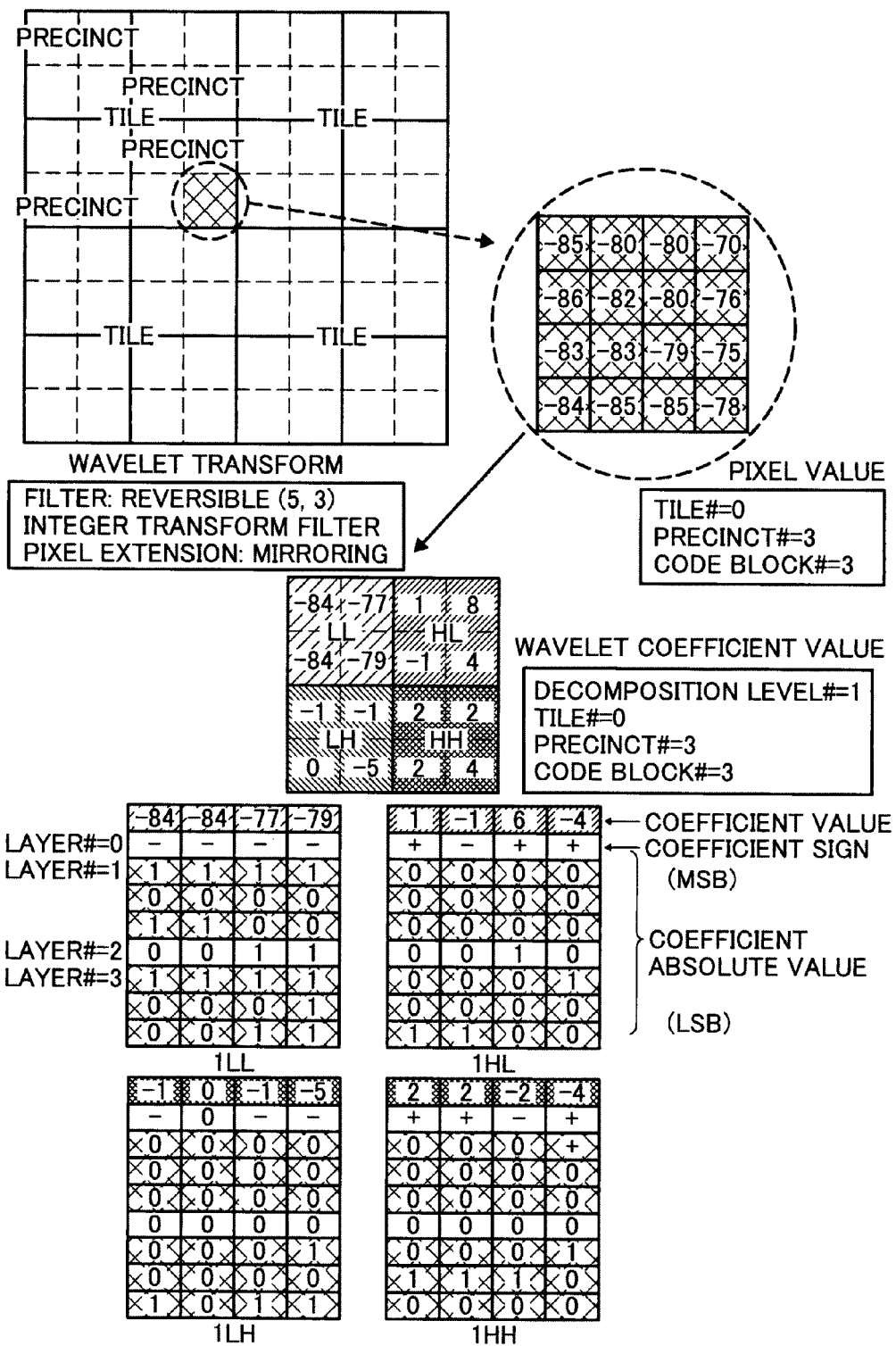
FIG. 5 is a schema illustrating one example of a procedure of ranking bit planes.

FIG. 5 is a schema illustrating one example of a procedure of ranking bit planes. As shown in FIG. 5, in this example, an original image (32×32 pixels) is divided into four tiles of 16×16 pixels each. The size of a precinct and the size of a code block at the decomposition level 1 are assumed to be 8×8 pixels and 4×4 pixels, respectively. Numbers are assigned to precincts and code blocks in raster order. In this example, numbers 0 to 3 are assigned to the precincts, while numbers 0 to 3 are assigned to the code blocks. For pixel extension outside tile boundaries, mirroring is used. Wavelet transform is performed by a reversible (5, 3) filter to find a wavelet coefficient value at the decomposition level 1.

Also, for tile 0/precinct 3/code block 3, an example of a concept of a typical "layer" structure is also shown in FIG. 5. A code block after transform is divided into sub-bands (1LL, 1HL, 1LH, and 1HH), and each sub-band is assigned with wavelet coefficient values.

The layer structure can be easily understood when wavelet coefficient values are viewed in a lateral direction (bit-plane direction). One layer is formed of an arbitrary number of bit planes. In this example, layers 0, 1, 2, and 3 are formed of bit planes of 1, 3, 1, 3, respectively. A layer including a bit plane closer to a Least Significant Bit (LSB) is subjected to quantization earlier. Conversely, a layer closer to a Most Significant Bit (MSB) is left unquantized to the last. A scheme of discarding layers from those closer to the LSB is called truncation, allowing fine control over a quantization ratio.

The entropy coding/decoding unit 104 shown in FIG. 1 codes the tiles 112 of each component 111 through probability estimation from the context and the target bits. With this, for all the components 111 of the original image, a coding process is performed in units of the tiles 112. Finally, the tag processing unit 105 couples all pieces of coded data from the entropy coding/decoding unit 104 into one piece of codestream data and adds a tag.

Figure 6:
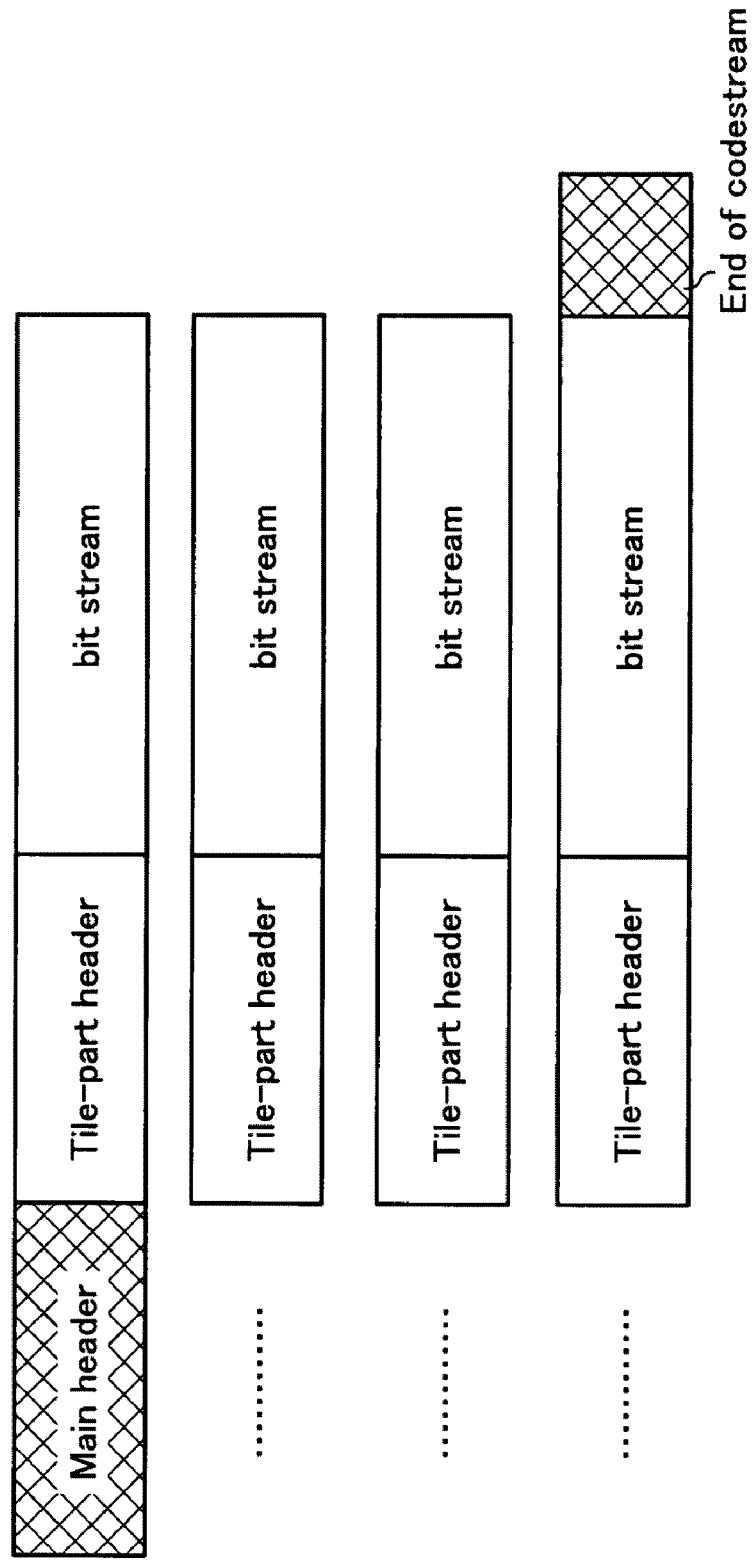
FIG. 6 is a schema illustrating a schematic structure of one frame of codestream data.
Figure 7:
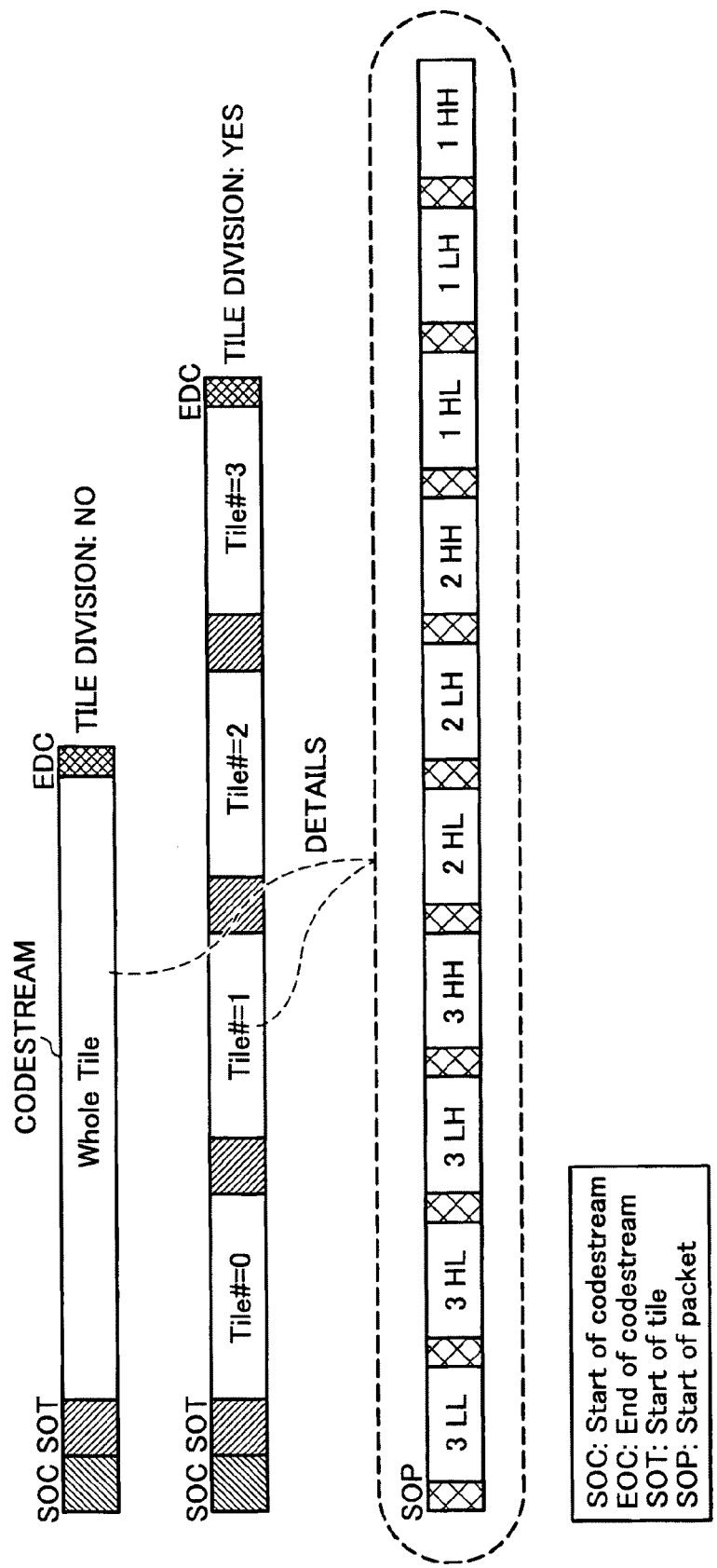
FIG. 7 is a schema illustrating a codestream structure representing packets containing coded wavelet coefficient values for each sub-band.

FIG. 6 depicts a schematic structure of one frame of this codestream data. To the head of the codestream data and the head of code data (bit stream) of each tile, tag information called headers (a main header and a tile-part header indicative of tile boundary position information and others, respectively) are added, followed by coding data of each tile. Here, the main header has written therein a coding parameter and a quantization parameter. At the end of the codestream data, a tag (end of codestream) is again placed. FIG. 7 depicts a codestream structure in which packets each containing coded wavelet coefficient values are represented for each sub-band. As shown in FIG. 7, irrespectively of whether a tile dividing process is performed, a similar packet stream structure is achieved.

On the other hand, at the time of decoding the coded data, conversely to image data coding, image data is generated from codestream data of each tile 112 of each component 111. In this case, the tag processing unit 105 interprets tag information added to the codestream data externally provided, decomposes the codestream data into codestream data of each tile 112 of each component 111, and then performs a decoding process (decompressing process) for each piece of codestream data of each tile 112 of each component 111. At this time, the positions of bits to be decoded are defined in the order based on the tag information in the codestream data. Also, the quantizing/inverse-quantizing unit 103 generates a context from a line of (already-decoded) peripheral bits of the target bit position. The entropy coding/decoding unit 104 then performs decoding through probability estimation from this context and the codestream data to generate a target bit, and then writes the target bit in its position. Since thus decoded data is space-divided for each frequency band, the data is subjected to two-dimensional wavelet inverse transform by the two-dimensional wavelet transforming/inverse-transforming unit 102, thereby reconstructing each tile of each component of the image data. The reconstructed data is transformed to image data of the original calorimetric system by the color-space transforming/inverse-transforming unit 101.

The above is the outlines of "the coding and decoding algorithm based on discrete wavelet transform".

In the meanwhile, various standards are defined in JPEG2000, such as, Part 2 of JPEG2000 (ISO 15444-2) including a coding option of ROI (region of interest), Part 3 of JPEG2000 (ISO 15444-3) defining a standard for moving pictures, and Part 6 of JPEG2000 (ISO 15444-6) defining a standard specific to compound images including different characteristics, such as pictures and characters.

Figure 8:
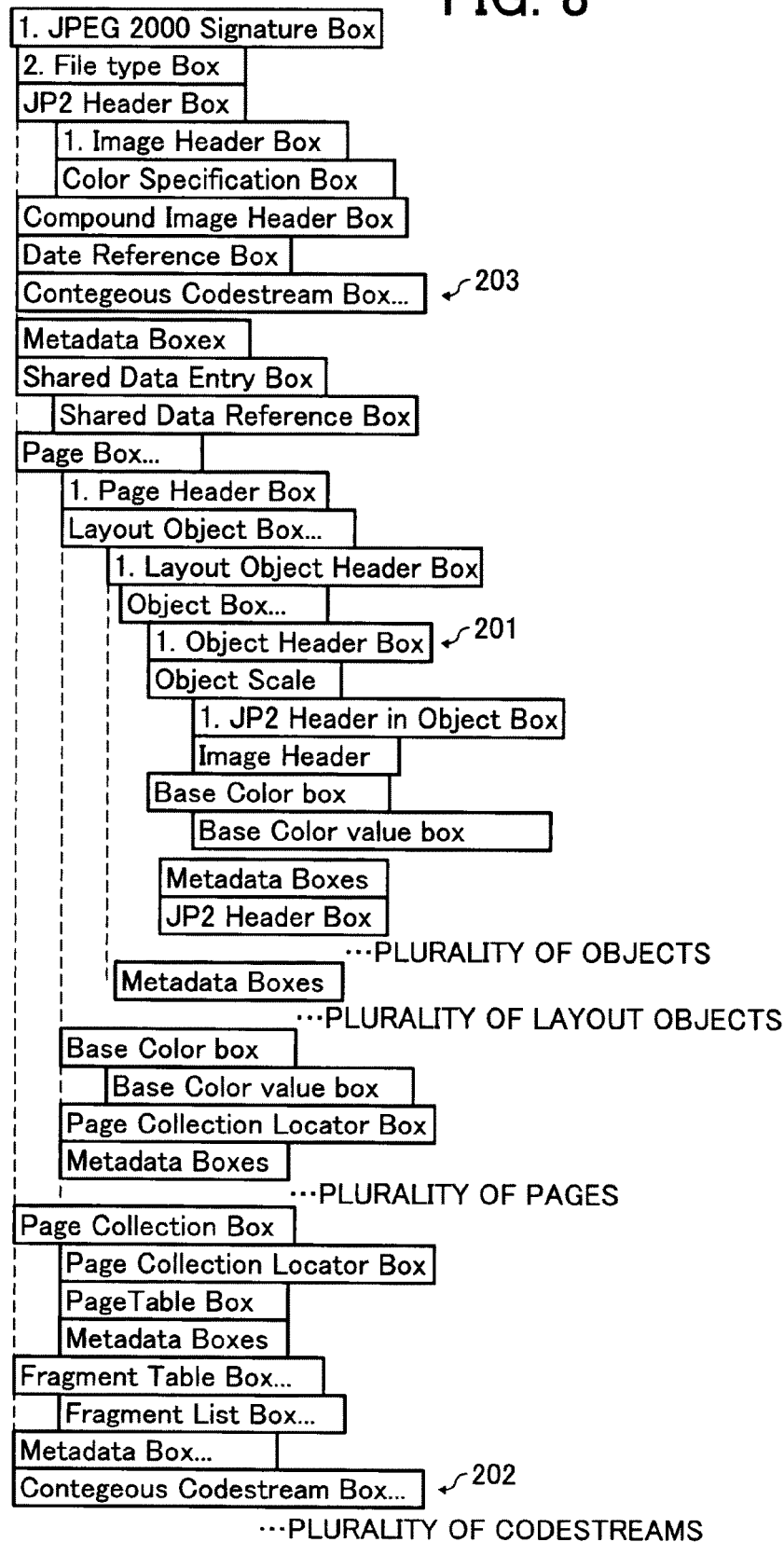
FIG. 8 is a schematic view of a data structure of a JPM file.

Now, Part 6 of JPEG2000 "Compound image file format" is explained. Part 6 of JPEG2000 is a standard specific to compound images including different characteristics, such as pictures and characters, and is defined in International Standard ISO 15444-6 disclosed in the second non-patent document. An extension of a file of JPEG2000 data defined in Part 6 of JPEG2000 is "JPM". A JPM file, which is an example of such a structured document, includes, as shown in FIG. 8, an object header box 201 in which an offset indicative of the position of the codestream, a codestream box 202 to be referenced, and other boxes 203. In this JPM file, data can be referenced in that file, the order of BOX information can be defined, and reference can be made not through position designation based on an offset but with a number to be referenced. For a predetermined BOX shown in FIG. 8, it is defined that the file can function as a standard, compatible JPM file even if the number of times of appearance or the order of appearance is varied as long as its level and range is maintained. By way of example, for a codestream for an object in each layout object, it is defined that a box can be placed at an arbitrary position as long as the logical structure of the structured document is satisfied and the box is placed 1) after a document thumbnail (a reference numeral 203 in FIG. 8), and 2) at a position at the highest level.

Next, an embodiment of the present invention is explained in detail. Although the embodiment is explained with respect to JPEG2000 as an example, it is needless to say that the present invention is not meant to be restricted to the embodiment.

Figure 9:
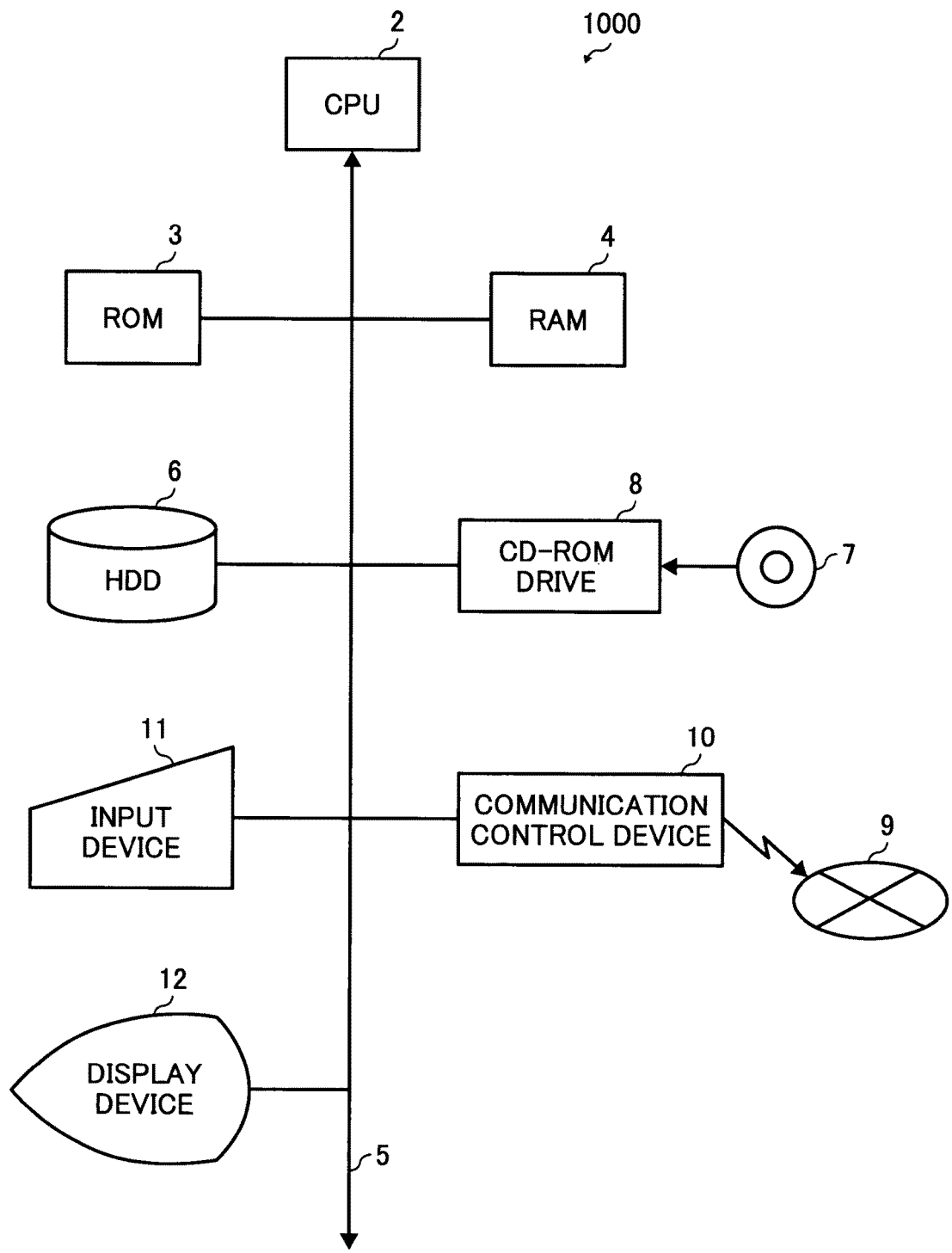
FIG. 9 is a block diagram of a hardware structure of a code transforming apparatus according to an embodiment.

FIG. 9 is a block diagram of a hardware structure of a code transforming apparatus 1000 according to the embodiment. The code transforming apparatus 1000 is formed mainly of, for example, a personal computer or a work station. As shown in FIG. 9, the code transforming apparatus 1000 includes a central processing unit (CPU) 2, which is a main unit of the computer and centrally controls each unit. The CPU 2 has connected thereto a read-only memory (ROM) 3, which is the ROM having a basic input output system (BIOS) and others stored therein, and a random access memory (RAM) 4 having various types of data rewritably stored therein, via a bus 5.

Furthermore, the bus 5 has connected thereto via an I/O not shown a hard disk drive (HDD) 6 having various programs and others stored therein; a compact disc ROM (CD-ROM) drive 8 that reads a CD-ROM 7 and serves as a mechanism for reading computer software, which is a distributed program; a communication control device 10 for transferring information through communication with other external computers via a network 9; an input device 11, such as a keyboard and a mouse, for inputting various instructions and information to the CPU 2; and a display device 12, such as a cathode ray tube (CRT) or a liquid crystal display (LCD), that displays the progress and result of the process and others.

Since having a property of rewritably storing various types of data, the RAM 4 functions as a working area of the CPU 2, that is, serving as a buffer, for example.

The CD-ROM 7 implements a storage medium of the present invention, having stored therein an operating system (OS) and various programs. The CPU 2 reads a program stored in the CD-ROM 7 with the CD-ROM drive 8, and then installs the program on the HDD 6.

Here, as a storage medium, not only the CD-ROM 7 but also media of various schemes, such as semiconductor memory, can be used, such as various optical disks including a digital versatile disk (DVD), various magneto-optical disks, and various magnetic disks including a flexible disk. Also, a program may be downloaded from the Internet or the like via the communication control device 10 to be installed on the HDD 6. In this case, a storage device having a program stored therein in a server at a transmitting side is also a storage medium of the present invention. Here, the program may be operated on a predetermined OS, may be the one that offloads execution of part of various processes, which will be explained further below, and then places it on the OS, or may be included as part of a series of program files forming predetermined application software or OS.

The CPU 2 that controls the operation of the entire system performs various processes based on the program loaded on the HDD 6, which may be used as a main storage of this system Next, among functions caused to be executed at the CPU 2 by various programs installed on the HDD 6 of the code transforming apparatus 1000, a characteristic function included in the code transforming apparatus 1000 according to one embodiment of the present invention is explained.

FIG. 10 is a block diagram of a functional structure of the code transforming apparatus 1000. In FIG. 10, 1000 denotes the code transforming apparatus 1000 according to one embodiment of the present invention, input a codestream (input codestream) 1001 of a transform target file to make an output codestream (output codestream) 1002 having equivalent contents but has a more compact file size. Here, the input codestream 1001 and the output codestream 1002 have the same syntax and sharing/referencing of BOX information being allowed.

For this transform, the code transforming apparatus 1000 has a feature of including a BOX decomposing unit 1003 that analyzes BOX information from the input codestream 1001; a sharing/referencing determining unit 1004 that determines whether a sharing process or a referencing process is to be performed on the cut-out BOX information; and a sharing/referencing processing unit 1005 that performs the sharing process or the referencing process required according to the determination result from the sharing/referencing determining unit 1004 on the BOX information analyzes from the input codestream 1001.

Figure 12:
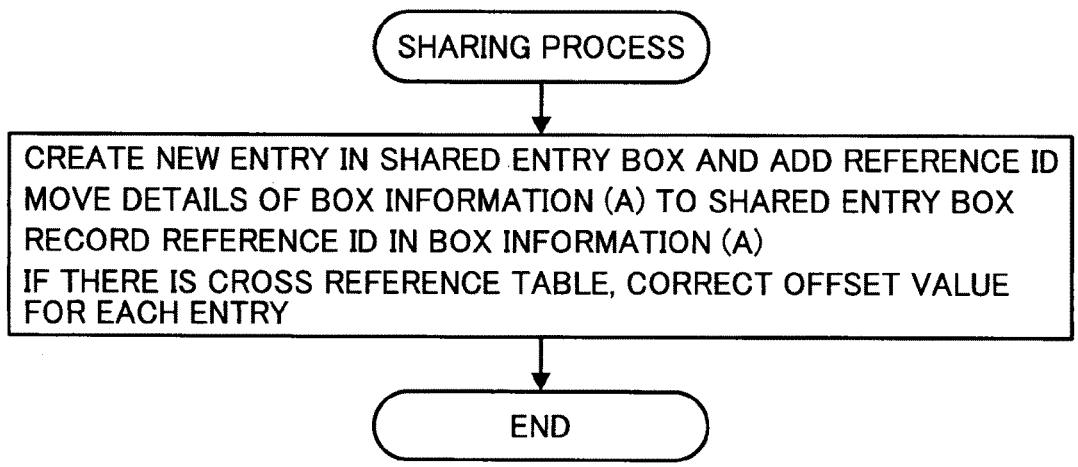
FIG. 12 is a detailed flowchart of a sharing process shown in FIG. 11.
Figure 13:
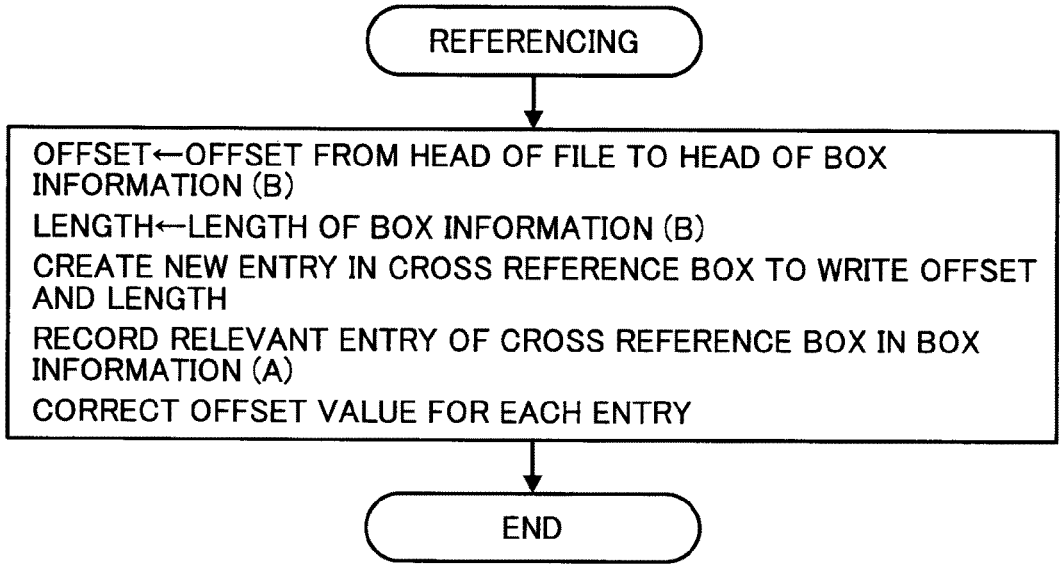
FIG. 13 is a detailed flowchart of a referencing process shown in FIG. 11.

FIG. 11 is a flowchart depicting an example of a process flow of the code transforming apparatus 1000. A "sharing process" and a "referencing process" called at step S9 in this flowchart are shown in FIGS. 12 and 13, respectively.

Figure 14:
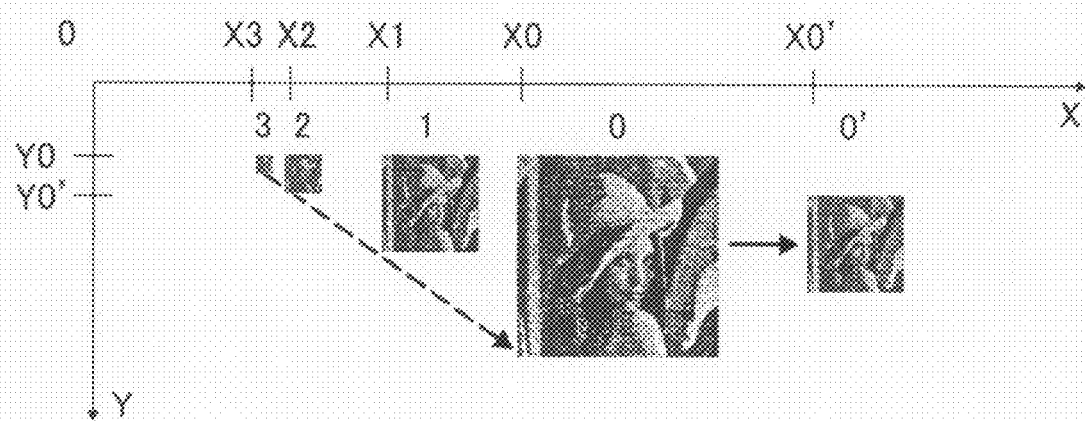
FIG. 14 is an example of a rendering image.
Figure 15:
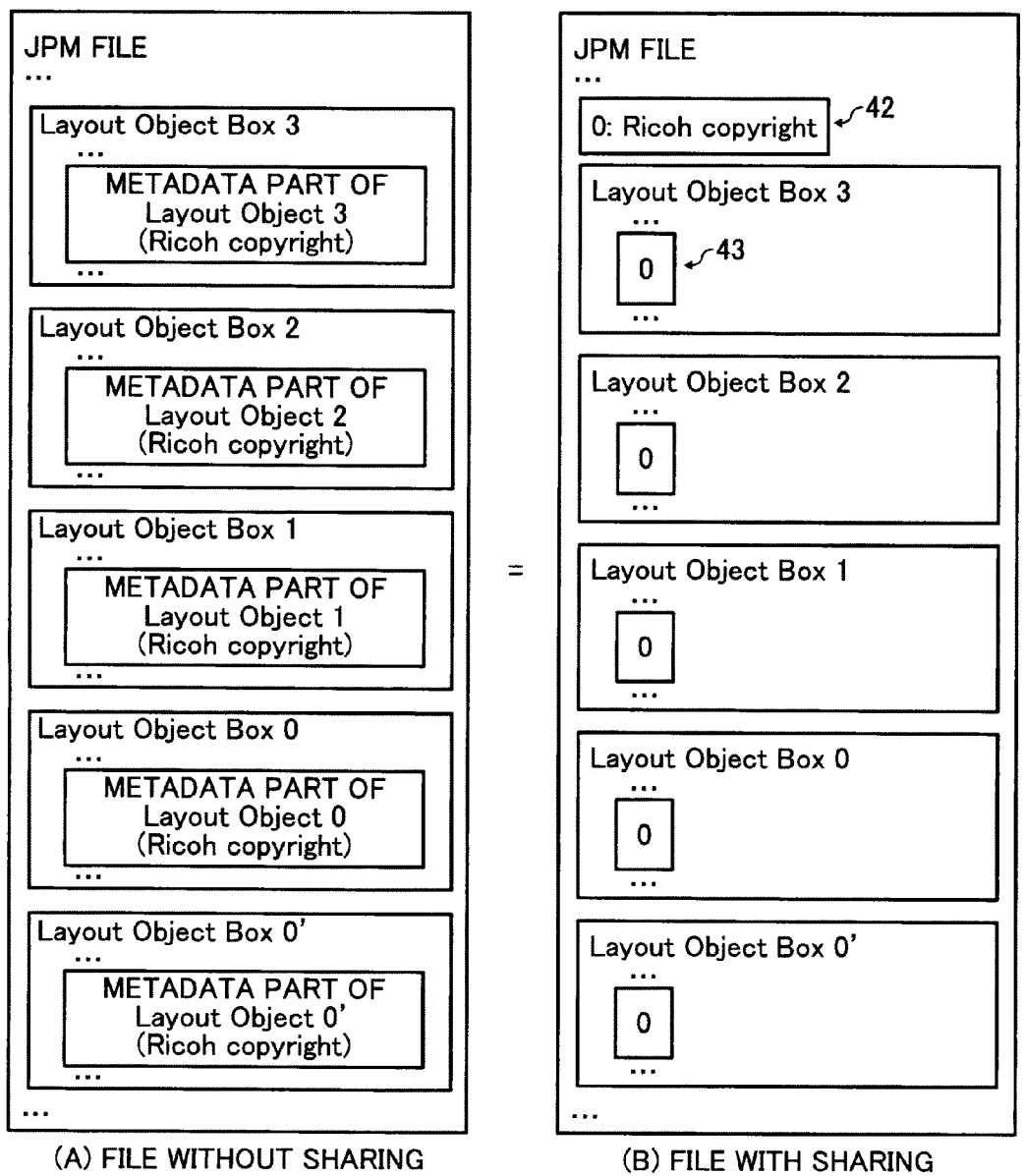
FIG. 15 is an example of JPM files in one of which the same copyright display metadata is shared and written in each layout object of FIG. 14.

Prior to the explanation of the operation of the code transforming apparatus 1000, an operation conception of the sharing/referencing process is explained by using FIGS. 14, 15, and 16.

FIG. 14 depicts an example in which the same images with different sizes are rendered at five positions on a page. It is assumed that each code data of five images 0, 1, 2, 3, 0' is provided with one piece of metadata with a copyright notice of "Ricoh copyright", which is not to be rendered.

Data to be shared/referenced depends on a coding format. For example, in the coding formats disclosed in the second and third non-patent documents, data to be shared is metadata and the header of BOX information; and data to be referenced is a codestream.

In the following explanation, a JPM file defined in the second non-patent document (ISO 15444-6) is taken as an example of a transform target file. However, the present invention can be applied not only to a JPM file but also to a similar coding format having a sharing/referencing mechanism. For example, the present invention can be applied to a file complying with ISO 15444-2, a file complying with ISO 15444-3, and a file complying with PDF specifications.

A conception of metadata in the file on such a page as in FIG. 14 is shown in FIG. 15. In FIG. 15, (a) depicts a file without no metadata sharing, in which each of the images 0, 1, 2, 3, 0' has a layout object of a "layout object box", and metadata of "Ricoh copyright" formed of fifteen letters is contained in a metadata part in that box. With five such layout objects corresponding to the respective images, the metadata parts contain a total of data of 75 bytes (=15×5).

In FIG. 15, (b) depicts a conception of a file with shared data, which is explained in detail in "B.1.8 Section" of the second non-patent document. That is, the metadata of "Ricoh copyright" is registered in a "shared data entry box" 42 in a JPM file along with an ID (identification), and the ID of the shared data is written in a metadata part 43 of a layout object corresponding to each image, thereby achieving sharing of the metadata. In this case, 17 bytes (=2 bytes of the ID+15 bytes of the metadata) in the "shared data entry box" and 2 bytes at each of reference destinations (here, a total of 10 bytes with five places) are required, and therefore the total number of bytes is 27 bytes. Therefore, compared with the case without sharing the metadata, the size can be compressed by as much as 48 bytes (=75-27).

Next, the case of referencing is explained. Data to be referenced is a codestream. In FIG. 14, assuming that five images are different only in position and size and images generated by specifying a reduction ratio are exactly identical in their contents, the images are rendered as follows:

Image 3 is rendered at a position (x3, y0) with a size of ¹⁄₆₄;
Image 2 is rendered at a position (x2, y0) with a size of ¹⁄₁₆;
Image 1 is rendered at a position (x1, y0) with a size of ¼;
Image 0 is rendered at a position (x0, y0) with a size of ¹⁄₁;
and
Image 0' is rendered at a position (x0', y0') with a size of ¼.

FIG. 16 depicts structures in this JPM file. In FIG. 16, (a) depicts a file without reference, in which five codestreams of "CodeStream" coded independently are contained correspondingly to the images 0, 1, 2, 3, and 0'. Although coding is length-variable, for simplification of explanation, it is assumed that the code length is proportional to the size of the image. For example, approximate sizes of the respective codestreams are assumed to be as follows:

The size of CodeStream 3=1 KB;
The size of CodeStream 2=4 KB;
The size of CodeStream 1=16 KB;
The size of CodeStream 0=64 KB; and
The size of CodeStream 0'=16 KB
the total size will be 101 KB.

On the other hand, (b) depicts a file with reference. Since there is the assumption that each of the images 0, 1, 2, 3, 0' can be uniquely determined based on the reduction ratio, these five codestreams are typified by one "CodeStream 0", an offset from the head of the file to CodeStream 0 of "offset" 44 and a length of "CodeStream 0" of "length" 45 are found and then are written in each reference destination. At each reference destination, "ScaleBox" information indicative of a size is present. With this, a ratio between the size of the image when the referenced codestream is extended and the size of the image to be rendered is specified, thereby reproducing the same images as is the case of (a).

At this time, the size of the data is 64 KB of "CodeStream 0". Therefore, compared with the case of (a) without reference, the size can be saved by as much as approximately 37 KB (=101 KB−64 KB). Here, since a reduction effect of writing a set of the offset and the length in the case of (b) in FIG. 16 instead of a name of a codestream in the case of (a) in FIG. 16 is so subtle, this effect is excluded in the calculation mentioned above.

Here, in the present invention, when an incremental codestream is referenced, a unit of a logical set of codes on a referenced side can be specified as a unit of reference. That is, the unit of reference can be set for each resolution, color component, position, and image quality. Also, when the unit of reference is set for each color component, the unit of reference can be set for each precinct or tile.

The above is the explanation of the conceptual operation of sharing/referencing. Needless to say, sharing and referencing are reversible transform operations.

Next, the operation of the code transforming apparatus 1000 according to one embodiment of the present invention is explained along the flowchart of FIG. 11.

At step S1, an input buffer and an output buffer are prepared. In the input buffer, a codestream (the input codestream 1001) of a file before transform is taken in. The output buffer is initialized.

At step S2, the BOX decomposing unit 1003 checks to see whether this is the last of the input codestream 1001. If this is not the last, the procedure goes to step S3, where the first one piece of BOX information is analyzed from the input codestream 1001 in the input buffer and is then input to BOX information (A).

Next, at step S4, the sharing/referencing determining unit 1004 checks to see whether sharing/referencing of the BOX information (A) is allowed. If it is determined at step S4 that sharing/referencing is not allowed, the file size cannot be made compact through sharing/referencing, and therefore the procedure returns to step S2.

On the other hand, if it is determined at step S4 that sharing/referencing is allowed, the procedure goes to step S5. At this step S5, the sharing/referencing determining unit 1004 checks to see whether the details of the BOX information (A) is written in a shared data format in the file and with an effective ID or is in a format in which an offset and a length from the head of the file to the referenced part are written via a necessary "fragment table". The former case is for sharing, and the latter case is for referencing. If the BOX information (A) is in either one of the formats, the BOX information (A) has already been in a sharing/referencing format, and therefore the procedure returns to step S2. On the other hand, if the BOX information (A) is in neither one of the formats, there is a possibility of sharing/referencing, and therefore the procedure goes to step S6 for finding a target for sharing.

A process from step S6 to step S10 is to detect whether there is a target to be shared/referenced in the input codestream 1001 for processing.

First, at step S6, the BOX decomposing unit 1003 analyzes the last BOX information of the input codestream 1001, and then sets it to BOX information (B). At step S7, the sharing/referencing determining unit 1004 checks to see whether the position of the BOX information (B) is behind the position of the BOX information (A). If these positions are matched with each other, it is determined that there is no target to be shared/referenced behind the position of the BOX information (A) and then the procedure goes to step S10. Otherwise, the procedure goes to step S8.

At step S8, the sharing/referencing determining unit 1004 checks to see whether the details of the previously-input BOX information (A) are identical to the details of the BOX information (B). If they are not matched, the procedure returns to step S7 to check the immediately previous BOX information. If they are matched, this is a candidate for sharing/referencing, and therefore the procedure goes to step S9.

At step S9, the sharing/referencing processing unit 1005 takes a procedure of updating the BOX information (A) as a shared or referenced data of the BOX information (B) according to a predetermined rule. Adopting which one of sharing and referencing may be predetermined, or may comply with to a certain rule such that sharing or referencing is allowed only in some cases, depending on the file specification.

For example, in ISO 15444-6 (Information technology-JPEG2000 Image Coding System-Part 6: Compound Image File Format), sharing and referencing in the same file as the BOX information (A) are both allowed. For BOX information in other JPM files complying with this specification, however, only referencing is allowed.

The sharing/referencing processing unit 1005 performs a sharing process shown in FIG. 12 when sharing is selected at step S9, while the sharing/referencing processing unit 1005 performs a referencing process shown in FIG. 13 when referencing is selected at step S9. With this, the BOX information (A) and the BOX information (B) are associated with each other. Then at the next step S10, the BOX information (A), a "cross reference table", and the "fragment table" are written out to the output buffer. The procedure then goes back to step S2 for processing the next BOX information.

Such a series of operations are performed on the last of the input codestream 1001. When the last of the input codestream 1001 is detected at step S2 (YES at step S2), the sharing/referencing processing unit 1005 goes to post-processing.

The post-processing differs depending on whether the BOX information (A) is shared or referenced. In the case of sharing, the BOX information (B) (information in a shared entry BOX) detected as sharing through the foregoing operations is substituted with a reference ID. On the other hand, in the case of referencing, since a part to be referenced corresponding to the BOX information (A) of the input stream has been updated with an offset and a length, there is nothing to be replaced, and therefore no particular process is required. This post-processing (steps S11 to S18) is further explained below.

First, at step S11, sharing/referencing is distinguished similarly to step S9. In the case of referencing, no particular post-processing is required, and therefore the procedure goes to step S18.

On the other hand, in the case of sharing, the procedure goes to step S12, wherein the details of the first entry of the shared entry box are copied to Buffer. At the next step S13, it is checked whether Buffer indicates "null" indicative of the last of the shared entry BOX. Therefore, if Buffer indicates "null", the procedure goes to step S18.

If Buffer does not indicate "null", the BOX information (B) for that entry is searched from the input codestream 1001. That is, at step S14, it is checked as to whether the details of the BOX information (B) are identical to Buffer sequentially from the last (or the first) of the input stream. If they are not matched, a similar operation is repeated on the next BOX information (B) to search for a matching point.

If a matching point is found at step S14, the procedure goes to step S15, wherein the BOX information (B) is updated to a reference ID corresponding to the relevant entry written in the shared BOX. Then at step S16, it is checked to see whether a cross reference BOX is present. If a cross reference BOX is present, the offset value becomes shifted with this updating. Therefore, although there is no problem if no cross reference BOX is present, if a cross reference BOX is present, the procedure goes to step S17, wherein the offset value is corrected.

Through the processes from step S1 to step S10, it has been known that the BOX information (B) is matched with the entry of the shared BOX at only one point. Therefore, after step S117, the next entry of the shared BOX is pointed without searching the last of the input codestream 1001, thereby repeating a similar operation for steps S13 to S17. Once it is detected that this is the last entry of the shared BOX at step 13, the procedure goes to step S18, wherein the cross reference BOX and the "Fragment List BOX" are written to the output buffer, thereby ending the process.

The sharing process and the referencing process called at step S9 are as shown in FIGS. 12 and 13, respectively. That is, as shown in FIG. 12, in the sharing process, a new entry is first created in a shared entry BOX, and its reference ID is added.

Next, the details of the BOX information (A) are moved to the shared entry BOX, and then an updating is performed to its reference ID. With this operation, the details of the shared entry BOX to be referenced are associated with the BOX information (A). At this time, the BOX information (A) is reduced in size by rewriting the reference ID of the BOX information (A).

Figure 17:
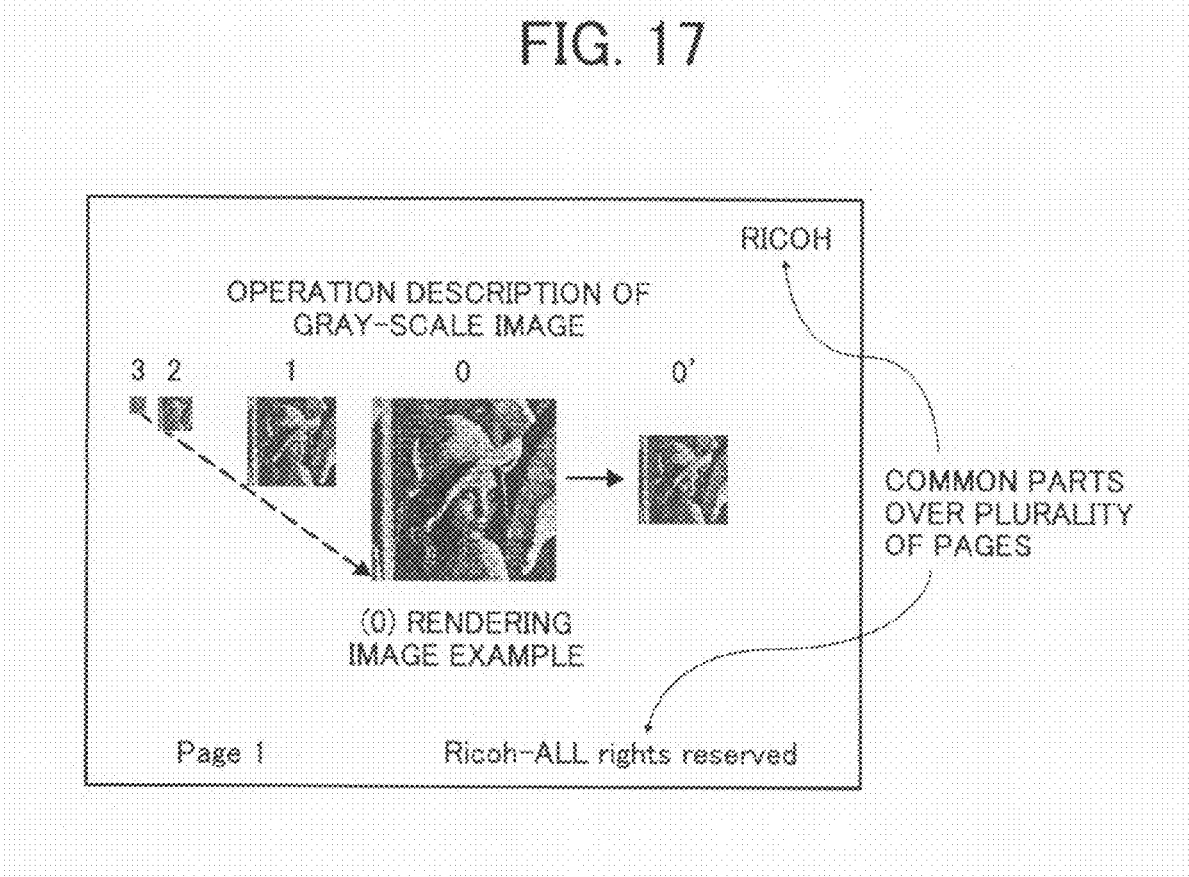
FIG. 17 is a schema of common parts over a plurality of pages.

With this, an offset from the head of the file to the point to be referenced is varied for another set with BOX information to be referenced behind the BOX information (A) in the file. Therefore, a value indicating "the size before change the size after change" of the BOX information (A) is subtracted from the previous offset value, thereby maintaining the relation between them. The sharing process is now completed. FIG. 17 depicts an example in which a common logo mark is printed over a plurality of pages of a document.

As shown in FIG. 13, referencing process tries to find out the followings:
an offset from the head of the file to the BOX information (B); and
a length of the BOX information (B).

The offset and the length are written in a "Fragment List BOX" linked from the cross reference BOX. The relevant entry of the cross reference BOX (in the case of a configuration where a different cross reference BOX is generated every time referencing is performed, a cross reference itself) is recorded in the BOX information (A). With this, the referencing side and the referenced side are associated with each other. Furthermore, with this change in value, the size of the BOX information (A) is reduced. Therefore, for the same reason explained in the sharing operation, if BOX information behind the position of the BOX information (A) is referenced for offsets of other entries in the cross reference BOX (or the "Fragment List BOX"), a value obtained by subtracting the size after change from the size before change is subtracted from the previous offset value, a relation between them is maintained. The referencing process is now completed.

In the code transforming apparatus 1000 according to the embodiment of the present invention, the sharing/referencing process is performed on a redundant part of a file in a unit of reference, which is a logical set of codes, thereby reducing the file size compared with the size before transform.

Next, an embodiment of the present invention is explained. The code transforming apparatus 1000 can perform a sharing/referencing process even on data of a local file or a remote file other than a file to be transformed (own file). This process is specifically explained with reference to FIG. 18.

Figure 18:
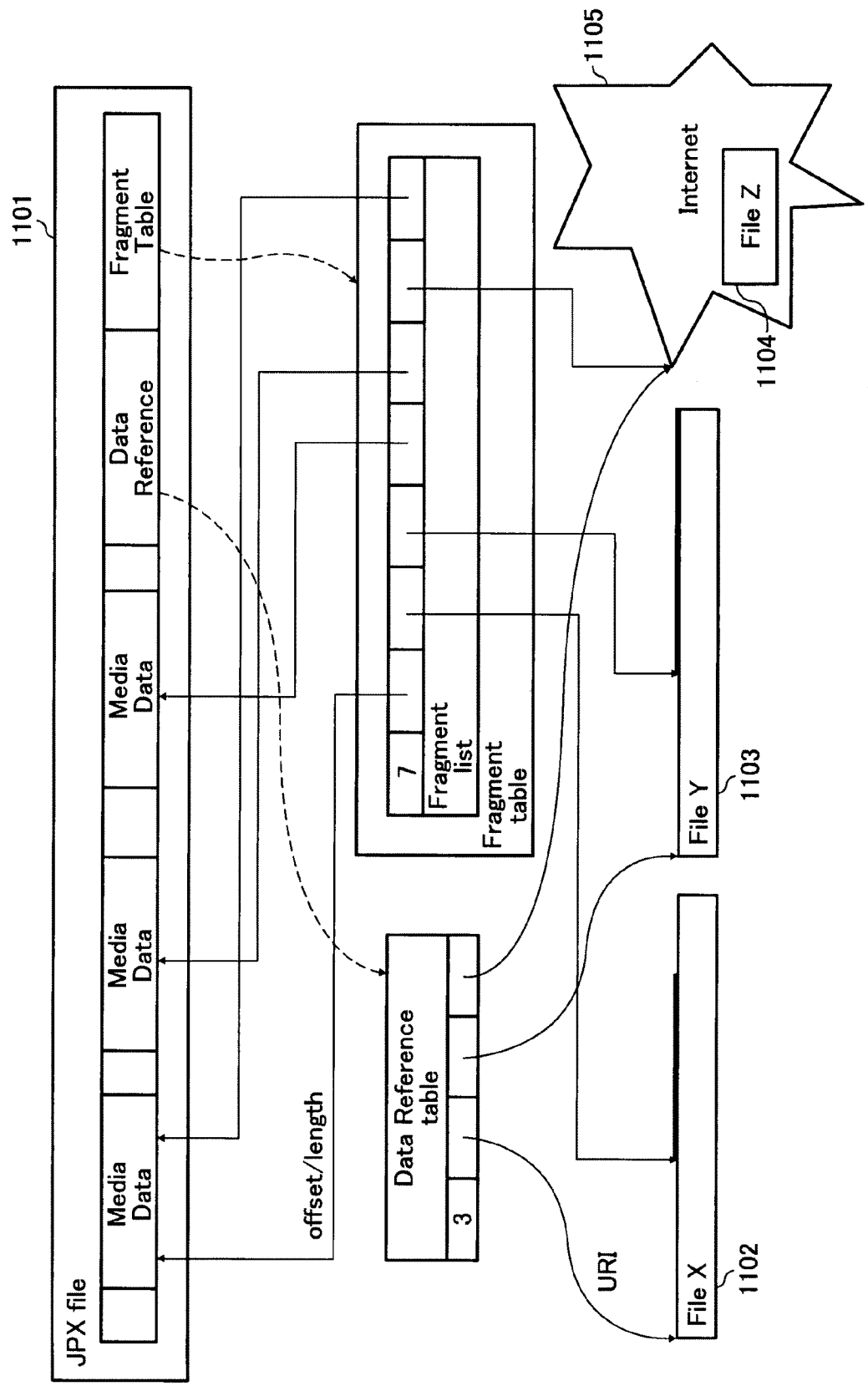
FIG. 18 is a schema illustrating an operation in a JPX file for referencing information in another file.

In FIG. 18, reference numeral 1101 denotes a transform target file (referred to as an own file). Reference numerals 1102, 1103, and 1104 denote other files shared/referenced in the own file. The files 1102 and 1103 are local files. The file 1104 is a remote file on a network 1105 such as the Internet.

Although the own file 1101 is explained as a JPX file disclosed in the third non-patent document, it is needless to say that the file can be a file in another specification with a mechanism similar to that of the JPX file.

The JPX file contains several areas called "Media Data". These are fragments of data corresponding to "CodeStream"

In the example shown in FIG. 18, seven entries have been registered with a "Fragment List Box", and these reference destinations are:
data in the own file 1101 for first, fourth, fifth, and seventh data;
data in the local files 1102 and 1103 for second and third data; and
data in the remote file 1104 for the sixth data.

Referencing data in the local file is performed as follows. The own file 1101 contains a "Data Reference BOX". In the example of FIG. 18, three entries are depicted. For each entry, the position of the file and the file name are specified with URIs (Uniform Resource Identifiers). With this, another file is referenced.

First, whether the reference destination is in the own file or another file is uniquely determined with a DR (Data Reference) bit of the "Fragment List". If the DR bit represents 0, the reference destination is in the own file. If the DR bit represents 1, the reference destination is in another file.

Then, which part in the other file is to be referenced is specified with a set of the offset and the length written in the relevant entry of the "Fragment List" in the "Fragment Table". In this manner, by referencing with exactly the same mechanism in which a fragment of the "Media Data" in the own file is referenced, a sharing/referencing process can be performed on the other file to reduce the file size.

A referencing scheme in the case where the other file to be referenced is a remote file on the network is as follows.

Since the "Data Reference table" in the "Data Reference Box" is generally written in URIs, when a remote file on the network is referenced, its name on the network is written in the "Data Reference table". With this, with exactly the same mechanism in which a fragment of the local file is accessed, the relevant part can be referenced with the offset and the length specified by the "Fragment List". Thus, the file size can be reduced through a sharing/referencing process on the remote file.

Next, another embodiment of the present invention is explained. The code transforming apparatus 1000 is provided with a unit (not shown) to which a user inputs an instruction for specifying or non-specifying a BOX to be shared/referenced.

Figure 19:
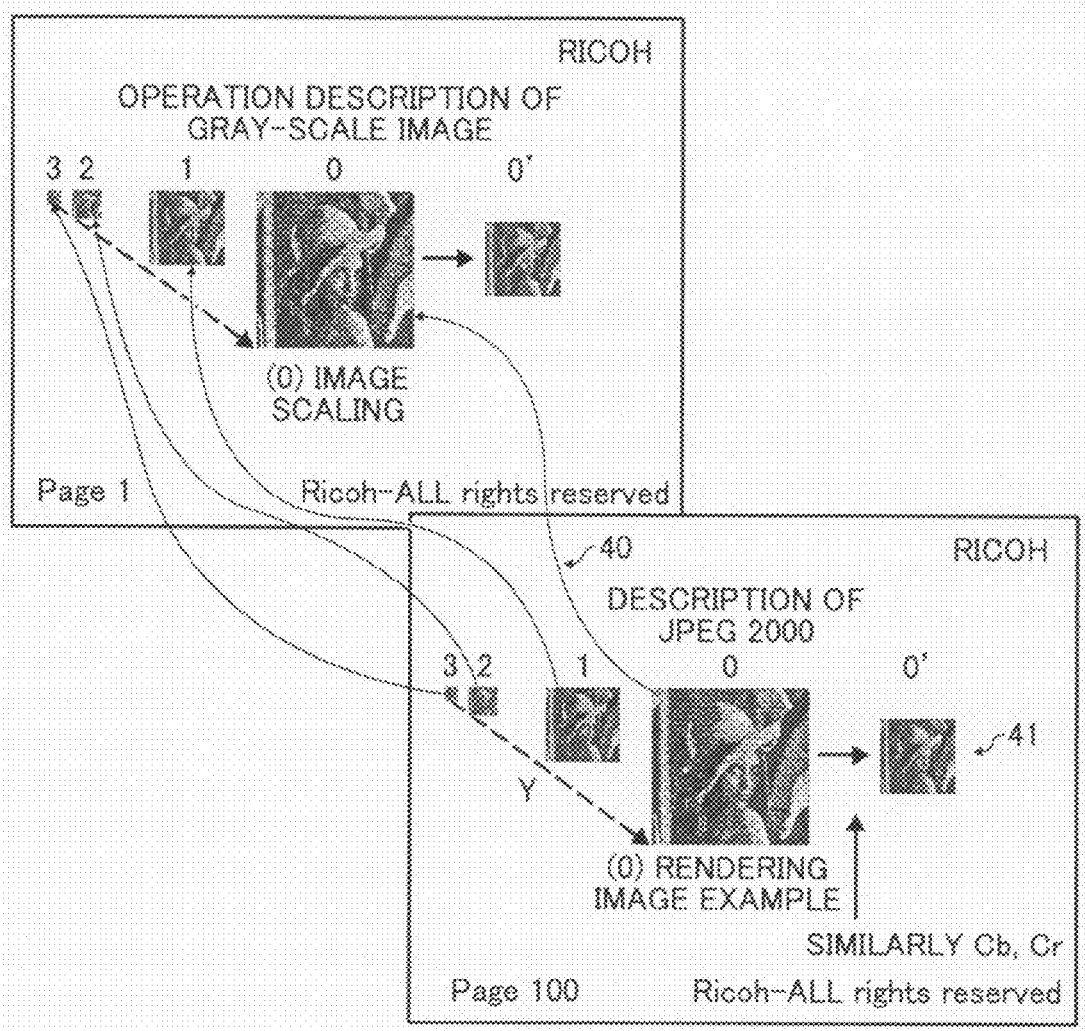
FIG. 19 is an example of an image when a referencing/non-referencing BOX is specified.

An operation of specifying a BOX to be shared/referenced by the user is explained by using FIG. 19. For convenience of explanation, data in a real space is used in FIG. 19 for explanation. Needless to say, in actual sharing/referencing, BOX information, such as coded data and metadata of a corresponding image, is to be processed.

Now, an example is explained in which code data already created on page 1 is referenced while editing page 100. Here, page 100 is a page on which color image scaling is explained, while page 1 is a page on which monochrome image scaling is explained.

On creating page 100, in consideration of a process independent for each brightness component and color difference component of the color image and easy to understand, there are parts (images 0, 1, 2, and 3) 40 in which images created on page 1 can be used as they are and a newly-created part (image 0') 41. Here, for the images 0, 1, 2, and 3, by the user specifying references of the images 0, 1, 2, and 3 on page 1, codes for the images to be referenced in the file can be explicitly presented. This operation is a simple operation achievable by checking to see whether the specified image is present on page 1 and, if the image is not present, writing an error and, if the image is present, writing its offset and length in the "Fragment List" shown in FIG. 18. Therefore, a flowchart of this operation is omitted herein.

Since the codes for the new image 0' 41 do not have any part to be referenced in the document, the codes are written in the relevant part in the file as new codes.

If the image to be referenced is not explicitly specified, the operation is more complex. However, this has already been explained in detail by using FIG. 18, and therefore is not explained herein. Furthermore, in the case of sharing, there are slight differences such that the offset and the length are not used for specification, registration is made in a shared entry BOX, and a transform is performed to a reference ID. However, these differences have been explained in detail by using FIGS. 19 and 20. Since data to be shared/referenced and data not to be shared/referenced can be intentionally distinguished from each other, the file size is not greatly varied before and after editing even for an image part scheduled to be edited in the future in the own file. Thus, a possibility of being unable to save after editing due to the limitation of an available space of a disk can be reduced. Also, a file can be configured so as not to depend on external reference data, such as other local files or remote files and, conversely, shared/referenced data can be unified, thereby performing control so that a document can be created with excellent easy to see and finish throughout the document.

When the user does not specify a BOX to be shared/referenced, all BOXes in the file are targeted, and the operation is as explained with reference to FIGS. 18, 19, and 20. With the sharing/referencing process targeted for all BOXes allowed to be shared/referenced, the highest reversible compression ratio can be achieved.

Next, still another embodiment of the present invention is explained. In the code transforming apparatus 1000, the sharing/referencing processing unit 1005 generates a status report indicating details of the transform and outputs it to the outside. This operation is explained by using FIG. 20.

Figure 20:
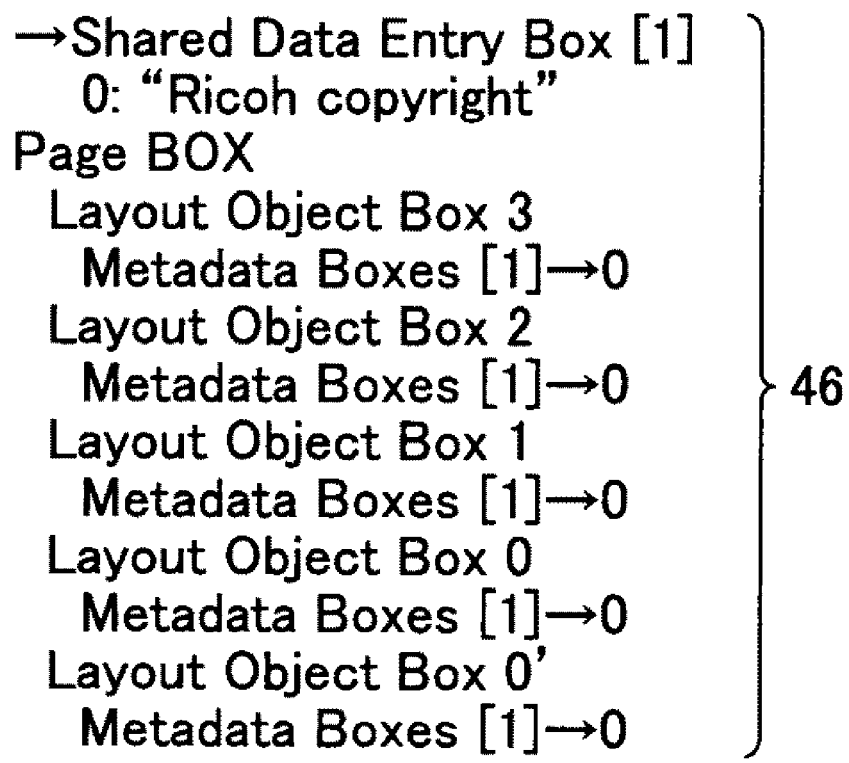
FIG. 20 is an example of a status report after a sharing process shown in FIG. 15.

FIG. 20 depicts an example of a status report generated when a sharing process shown in FIG. 15 is performed. In FIG. 20, a first part 46 indicates a corresponding relation before and after transform of each BOX. In each BOX, a portion before "→" represents a state before transform, while a portion after "→" represents a state after transform. In FIG. 20, a latter part 47 represents a variation in file size due to transform.

In the following, the example shown in FIG. 20 is explained by taking a JPM file in ISO 15444-6 as an example. Needless to say, however, this explanation can be applied to another file structure achieving a similar function.

First, "→Shared Data Entry Box [1]" indicates that:
reference ID=0; and
Shared Data="Ricoh copyright"
have been created. The next "Page BOX" indicates that each of "Metadata Boxes [1]" of:
Layout Object Box 3;
Layout Object Box 2;
Layout Object Box 1;
Layout Object Box 0; and
Layout Object Box 0'
is written with
Reference ID=0.
Then, the following is indicated:
Newly-created size because of transform=28 bytes;
Deleted size because of transform=80 bytes; and
Reduced size because of transform=52 bytes (=80−28).
Here, details of the newly-created size are as follows:
Shared Data Entry Box
ID=2 bytes
Shared Data="Ricoh copyright ¥ 0"=16 bytes (1 byte of ¥ 0 is inserted as a last delimiter of a character string)
"Metadata Boxes [1]" of each "Layout Object Box"
ID=2 bytes×five places.
The deleted size is "Metadata Boxes [1]" of each "Layout Object Box", where "Ricoh copyright ¥ 0"=16 bytes are written in five places. This is the deleted portion.

From the difference between these two numbers of bytes, it is reported that reduction is made by 52 bytes in the entire file.

In the foregoing, the case of sharing has been explained. Also in the case of referencing, by referencing the algorithms explained so far, the correspondence before and after transform and the state of change in file size in the example of FIG. 16 can be similarly explained.

As can be seen from the example of the status report shown in FIG. 20, a status report of comparison for each object to be shared/referenced is output. Therefore, the correspondence of the object to be shared/reference can be easily checked. Also, since the reduced size through transform is presented, the effect of sharing/referencing can be easily checked.

In the status report, the unit of reference may be changed so that creating/examining/approved is indicated. Further, in the status report, the unit of reference may be changed so that creating/editing/approved is indicated.

Next, still another embodiment of the present invention is explained. As has been explained in association with FIG. 18, for referencing a remote file, if its referencing range cannot be specified, all files around the world are to be referenced, and it takes a significant amount of time to perform a transforming process. To get around this, by specifying a range of the network, such as the Internet, exemplified in FIG. 18, the target range is required to be restricted. According to this embodiment of the present invention, the code transforming apparatus 1000 is additionally provided with a unit for the user to specify such a reference range (not shown).

As a default, the range can be within its own segment, for example. Other examples include: the number of hops, which represents a range around its own segment passing through a router; a domain, which represents a range managed by a network administrator; a range of work groups coupled for a common purpose without a network administrator; and a range specified by a list of URLs to be referenced.

These ranges can be defined on the network, and their operations are as explained in detail in network-related documents. At any rate, with the range being clarified, a relation between the range of sharing/referencing and its effect can be appropriately managed. Also, the reference range of remote files is specified by the number of hops according to one embodiment of the present invention, by domain names or their list according to another embodiment of the present invention, and by work group names or their list according to still another embodiment of the present invention.

Next, still another embodiment of the invention is explained with reference to FIG. 21.

Figure 21:
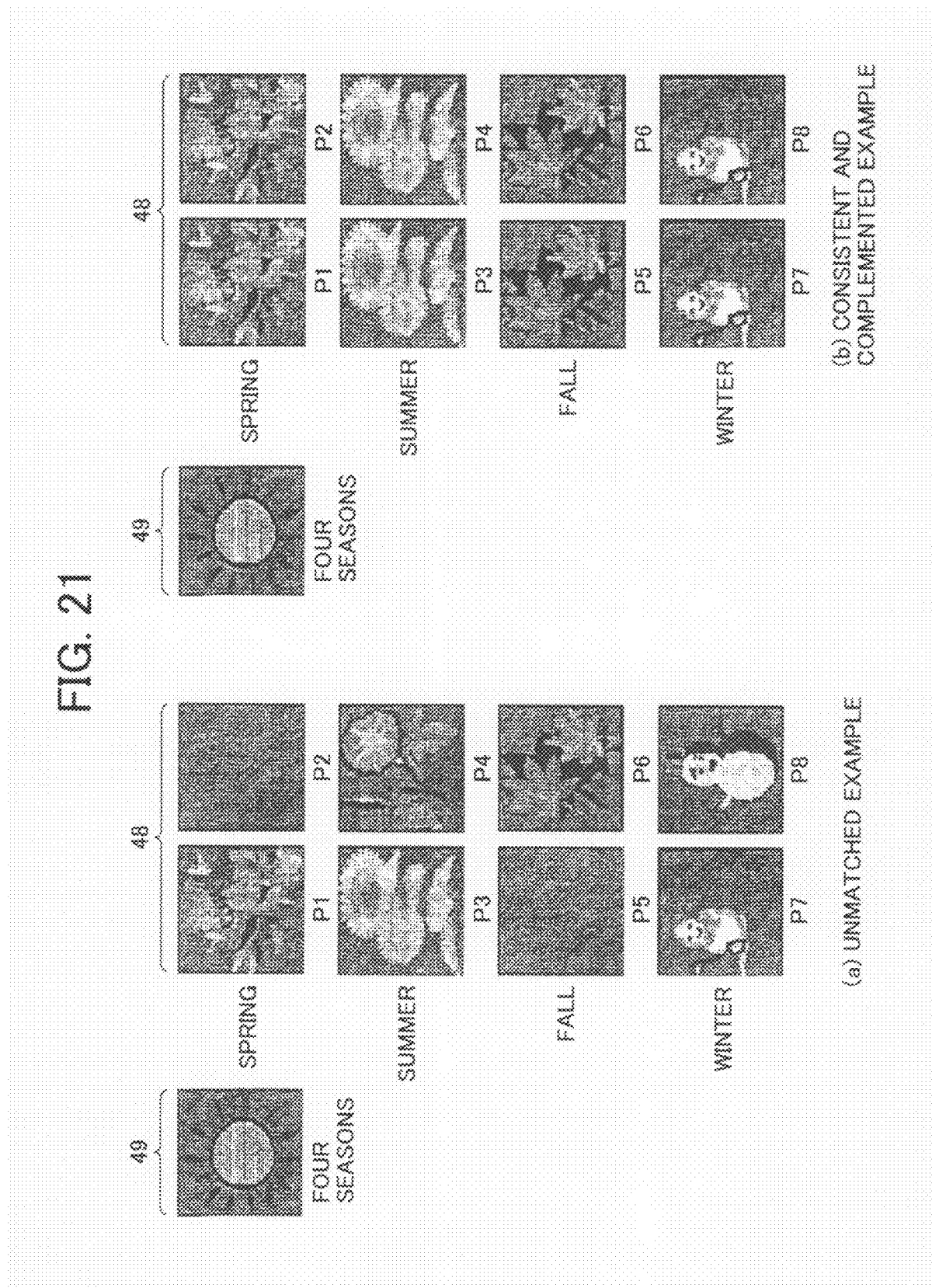
FIG. 21 is a schema illustrating making page thumbnails consistent and complemented.
Figure 22:
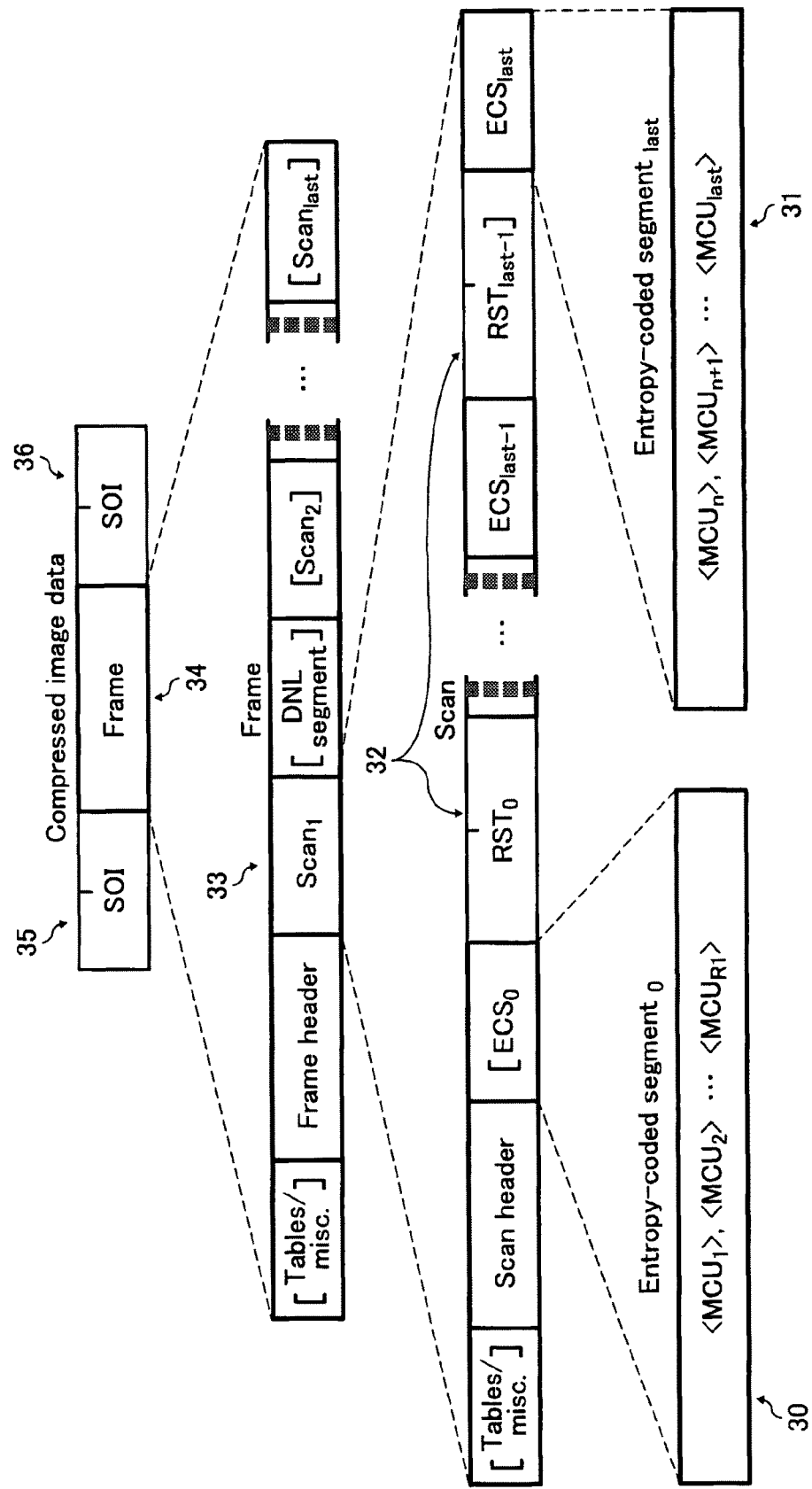
FIG. 22 is a schema of a syntax of a sequential DCT, a progressive DCT, and a lossless DCT.

FIG. 21 depicts making page thumbnails consistent and complemented. Here, for simplification, an example is explained in which there is a document with a document name "Four Seasons" containing eight pages in total with two pages assigned to each season, and each page is created by a different person and then these pages are unified. In such a case, as shown in (a) of FIG. 21, for example, page thumbnails 48 are generally not matched. Details of the page thumbnails are as follows.

| "Page" | "Theme" | "Icon" |
| --- | --- | --- |
| p. 1 | Spring | Azalea |
| p. 2 | Spring | Pear (unmatched with p. 1 also indicating spring) |
| p. 3 | Summer | Sunflower |
| p. 4 | Summer | Morning glory (unmatched with p. 3 also indicating summer) |
| p. 5 | Autumn | Pear |
| p. 6 | Autumn | Autumn leaves (unmatched with p. 5 also indicating autumn) |
| p. 7 | Winter | Snowman 1 |
| p. 8 | Winter | Snowman 2 (unmatched with p. 7 also indicating winter) |

Here, a situation is assumed in which the appearance of the document is changed so that these page thumbnails become those as shown in (b) of FIG. 21 that are consistent for each season.

Figure 23:
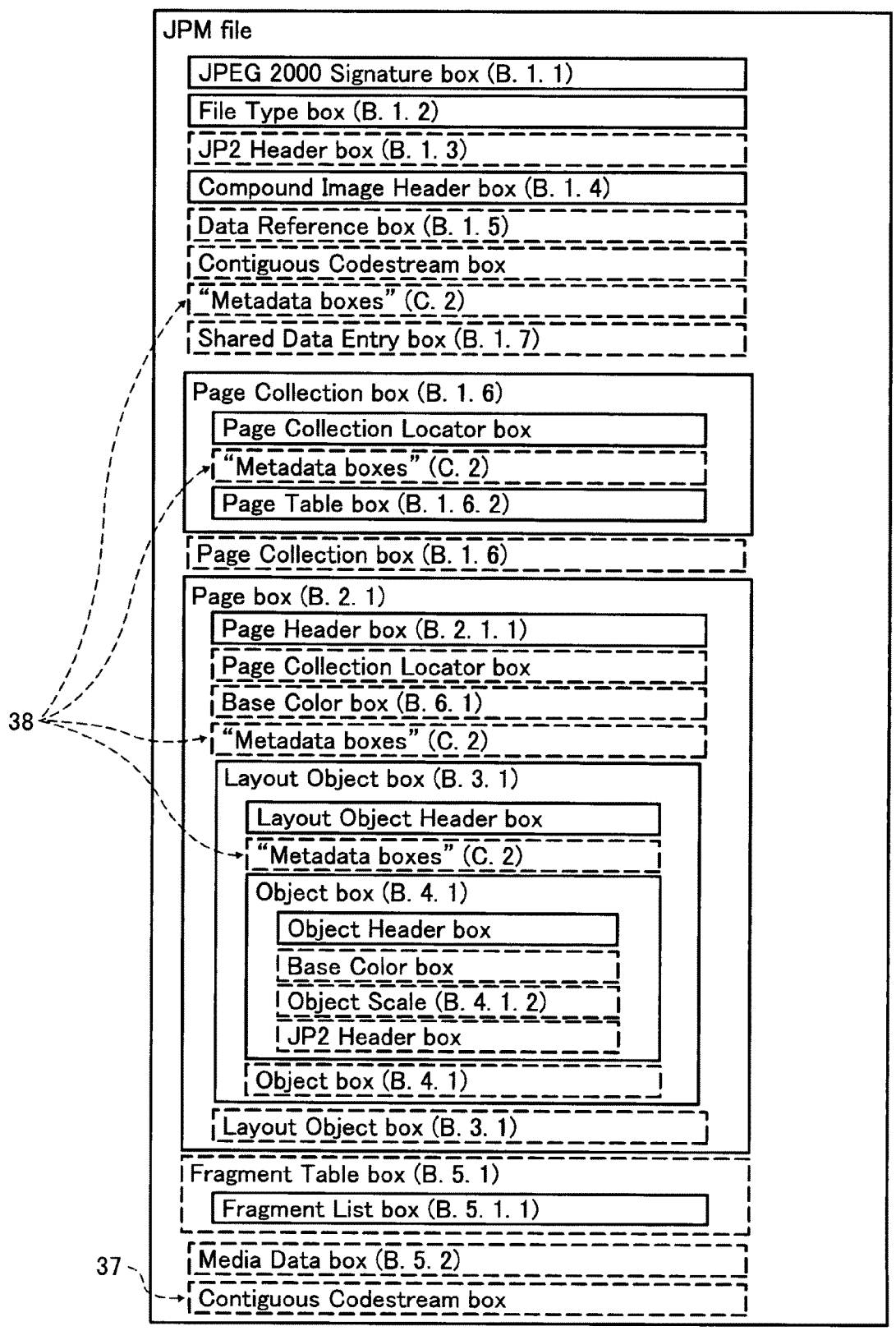
FIG. 23 is a schema of a conceptual structure of a JPM file.

If this document is coded in a coding scheme in ISO 15444-6 disclosed in the second non-patent document, each page thumbnail is present in the first "Layout Object Box" of the "Page Box" shown in FIG. 23. Therefore, through the referencing process with the procedure explained in FIGS. 18 and 20, the thumbnail on p. 2 is made identical to the thumbnail on p. 1 by referencing the thumbnail on p. 1. The pictures on p. 3 and p. 4 are not consistent even though the thumbnails are summer thumbnails. For example, by referring the thumbnail on p. 3 with the same offset and the length of those of the codestream written in the first layout box on p. 4, the thumbnails on p. 3 and p. 4 can be made consistent. Similarly, the page thumbnail on p. 6 is referenced on p. 5 and the page thumbnail on p. 7 is referenced on p. 8, page thumbnails can be made consistent for each season as shown in (b) of FIG. 21. Here, 49 in FIG. 21 denotes a document thumbnail.

Through the operation explained above, the page thumbnails can be made consistent to be a common page thumbnail for each page on the same theme. This can contribute to excellent appearance of the document and also reduction in file size. The above is the explanation of one embodiment of the present invention, but can be applied to another embodiment of the present invention.

That is, if no page thumbnail is present on a certain page, a page thumbnail on another page is referenced. This has been explained in the example of referencing the thumbnail on p. 1 for the thumbnail on p. 2. This can contribute to excellent appearance of the document and also reduction in file size.

Also, according to still another embodiment of the present invention, a common document thumbnail is used for each document. In FIG. 21, making page thumbnails consistent and complemented is explained, and a similar operation is performed document thumbnails over documents. Its specific operation can be understood by replacing the words:

(1) the page thumbnail by a document thumbnail;
(2) the first layout box of each page by a "Contiguous Codestream BOX" on the sixth from the top in FIG. 6; and
(3) referencing in the own file by referencing of other local files or remote files.

In still another embodiment of the present invention, the file complying with ISO 15444-2 is a process target. That is, since a JPX file disclosed in the third non-patent document has a structure that allows sharing/referencing, with the transforming process explained above, reversible recompression can be achieved with international standard compatibility being maintained.

In still another embodiment of the present invention, the file complying with ISO 15444-3 is a process target. That is, since an MJ2 file complying with ISO 15444-3 has a structure that allows sharing/referencing, with the transforming process explained above, reversible recompression can be achieved with international standard compatibility being maintained.

In still another embodiment of the present invention, the file complying with ISO 15444-6 is a process target. That is, since a JPM file disclosed in the second non-patent document has a structure that allows sharing/referencing, with the transforming process explained above, reversible recompression can be achieved with international standard compatibility being maintained.

In still another embodiment of the present invention, the file complying with PDF specifications is a process target. That is, since a PDF file has a structure that allows sharing/referencing, with the transforming process explained above, reversible recompression can be achieved with PDF compatibility being maintained.

Incidentally, the sharing/referencing process on a redundant part of a file in a unit of reference, which is a logical set of codes, can be easily achieved by loading a program onto a computer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A code transforming apparatus comprising a code transforming unit that performs a transforming process to transform a first codestream of a target file to a second codestream that is equivalent in content to the first codestream and smaller in file size, wherein the code transforming unit comprises:
   an extracting unit to extract BOX information from the first codestream, the BOX information indicating an object encapsulated in a file and having a binary structure;
   a determining unit to determine whether any one of a sharing process and a referencing process is to be performed on the BOX information; and
   a processing unit to perform any one of the sharing process and the referencing process on the BOX information based on a determination result from the determining unit, wherein the processing unit can specify a logical set of codes on a referenced side as a unit of reference for referencing an incremental codestream.

2. The code transforming apparatus according to claim 1, wherein at least one of a local file and a remote file other than the target file is subjected to any one of the sharing process and the referencing process in the transforming process.

3. The code transforming apparatus according to claim 1, further comprising an input unit through which an instruction is input to specify whether the BOX information is to be subjected to any one of the sharing process and the referencing process in the transforming process.

4. The code transforming apparatus according to claim 1, further comprising a report creating unit to create a status report indicating content of the transforming process.

5. The code transforming apparatus according to claim 1, wherein the unit of reference can be set for each at least one of resolution, color component, position, image quality, precinct, and tile.

6. A code transforming method to transform a first codestream of a target file to a second codestream that is equivalent in content to the first codestream and smaller in file size, the code transforming method comprising:
   extracting BOX information from the first codestream, the BOX information indicating an object encapsulated in a file and having a binary structure;
   determining whether any one of a sharing process and a referencing process is to be performed on the BOX information; and
   performing any one of the sharing process and the referencing process on the BOX information based on a determination result obtained as a result of determining whether any one of the sharing and referencing processes are to be performed, wherein
   during processing, a logical set of codes on a referenced side can be specified as a unit of reference for referencing an incremental codestream.

7. The code transforming method according to claim 6, wherein at least one of a local file and a remote file other than the target file is subjected to any one of the sharing process and the referencing process in the transforming process.

8. The code transforming method according to claim 6, further comprising inputting an instruction to specify whether the BOX information is to be subjected to any one of the sharing process and the referencing process in the transforming process.

9. The code transforming method according to claim 6, further comprising creating a status report indicating content of the transforming process.

10. The code transforming method according to claim 6, wherein the unit of reference can be set for each at least one of resolution, color component, position, image quality, precinct, and tile.

* * * * *